(12) United States Patent
Corley et al.

(10) Patent No.: US 11,667,206 B2
(45) Date of Patent: Jun. 6, 2023

(54) MODULAR CHARGING AND POWER SYSTEM

(71) Applicant: UNIVERSAL POWER & PNEUMATICS, LLC, Atlanta, GA (US)

(72) Inventors: Clifford Brian Corley, Hampton, GA (US); Thomas Grady Boynton, Jasper, GA (US); Simon Hyen Ahn, Atlanta, GA (US)

(73) Assignee: UNIVERSAL POWER & PNEUMATICS, LLC, Atlanta, GA (US)

( * ) Notice: Subject to any disclaimer, the term of this patent is extended or adjusted under 35 U.S.C. 154(b) by 0 days.

(21) Appl. No.: 17/810,470

(22) Filed: Jul. 1, 2022

(65) Prior Publication Data

US 2023/0006457 A1 Jan. 5, 2023

Related U.S. Application Data

(60) Provisional application No. 63/217,942, filed on Jul. 2, 2021.

(51) Int. Cl.
*B60L 53/56* (2019.01)
*B60L 53/80* (2019.01)
(Continued)

(52) U.S. Cl.
CPC ............... *B60L 53/56* (2019.02); *B60L 53/30* (2019.02); *B60L 53/80* (2019.02); *F02B 21/00* (2013.01);
(Continued)

(58) Field of Classification Search
CPC ....................................................... B60L 53/56
(Continued)

(56) References Cited

U.S. PATENT DOCUMENTS

| 4,018,050 | A | | 4/1977 | Murphy | |
|---|---|---|---|---|---|
| 4,525,631 | A | * | 6/1985 | Allison | ..................... F03D 9/17 290/44 |

(Continued)

FOREIGN PATENT DOCUMENTS

| CN | 1928356 A | 3/2007 |
|---|---|---|
| CN | 103362555 B | 7/2015 |

(Continued)

OTHER PUBLICATIONS

International Search Report & Written Opinion for PCT/US2022/073376; dated Oct. 28, 2022; 12 pgs.

*Primary Examiner* — Jerry D Robbins
(74) *Attorney, Agent, or Firm* — Gardner Groff & Greenwald, PC

(57) ABSTRACT

A modular charging and power system for generating and supplying electrical power to electric vehicles, hybrid electric vehicles, other manned and unmanned remotely operated vehicles, drones, robotics, marine and aerospace vehicles, equipment, or apparatus, portable power units, propulsion systems, and other electrically powered systems. The modular charging and power system comprises a racking system for retaining one or more interchangeable power modules. Each power module comprises a generator driven by a power unit, a compressor to deliver high-pressure driving fluid to the power unit, and a battery bank. Electrical power generated by the generator powers the compressor, the battery bank, and/or an external electronic device or system.

20 Claims, 12 Drawing Sheets

(51) Int. Cl.
*B60L 53/30* (2019.01)
*F02B 21/00* (2006.01)
*H02J 7/00* (2006.01)
*H02J 7/14* (2006.01)

(52) U.S. Cl.
CPC .......... *H02J 7/0013* (2013.01); *H02J 7/0045* (2013.01); *H02J 7/1415* (2013.01)

(58) Field of Classification Search
USPC ........................................................ 320/109
See application file for complete search history.

(56) References Cited

U.S. PATENT DOCUMENTS

| | | | |
|---|---|---|---|
| 4,896,505 A * | 1/1990 | Holleyman | F04F 5/54 60/407 |
| 5,296,799 A * | 3/1994 | Davis | B60L 50/90 60/412 |
| 5,491,977 A * | 2/1996 | Cho | F01B 23/02 60/370 |
| 6,327,858 B1 * | 12/2001 | Negre | F01B 17/02 60/659 |
| 6,508,324 B1 * | 1/2003 | Conley, Jr. | B62M 1/10 180/65.21 |
| 8,548,660 B2 | 10/2013 | Thai-Tang et al. | |
| 8,795,876 B2 | 8/2014 | Thomas et al. | |
| 8,884,582 B2 | 11/2014 | DeFrank et al. | |
| 8,955,625 B2 | 2/2015 | DeFrank et al. | |
| 9,108,497 B2 | 8/2015 | Harrison, III et al. | |
| 9,163,585 B2 | 10/2015 | McLain et al. | |
| 9,234,436 B2 | 1/2016 | Zhou et al. | |
| 9,381,822 B2 | 7/2016 | Scheucher | |
| 9,475,394 B2 | 10/2016 | Huff | |
| 10,170,741 B2 | 1/2019 | Kovent | |
| 10,319,494 B2 | 6/2019 | Kovent | |
| 10,957,887 B2 | 3/2021 | Kovent | |
| 11,258,104 B2 | 2/2022 | Chidester et al. | |
| 11,312,258 B2 * | 4/2022 | Saborit | H02K 11/0094 |
| 2006/0225941 A1 | 10/2006 | Cole | |
| 2010/0141206 A1 * | 6/2010 | Agassi | H01M 50/202 320/109 |
| 2010/0296949 A1 * | 11/2010 | Corley | F04B 9/1095 60/407 |
| 2011/0061958 A1 * | 3/2011 | Morgan | B60L 53/80 180/68.5 |
| 2011/0086741 A1 | 4/2011 | DeFrank et al. | |
| 2011/0190083 A1 | 8/2011 | Harrison, III et al. | |
| 2012/0299531 A1 | 11/2012 | Prosser et al. | |
| 2013/0177795 A1 * | 7/2013 | Power | H01M 50/271 29/623.5 |
| 2013/0312496 A1 | 11/2013 | McLain | |
| 2013/0312838 A1 | 11/2013 | McLain | |
| 2018/0108891 A1 * | 4/2018 | Fees | H01M 50/505 |
| 2019/0009665 A1 | 1/2019 | Maskew et al. | |
| 2019/0157639 A1 | 5/2019 | Smith et al. | |
| 2019/0351749 A1 * | 11/2019 | Domes | B60K 3/04 |
| 2020/0406780 A1 * | 12/2020 | Hassounah | B60L 53/35 |

FOREIGN PATENT DOCUMENTS

| | | |
|---|---|---|
| CN | 114215716 A | 3/2022 |
| DE | 202013100235 U1 | 4/2013 |
| WO | 0220299 A1 | 3/2002 |

* cited by examiner

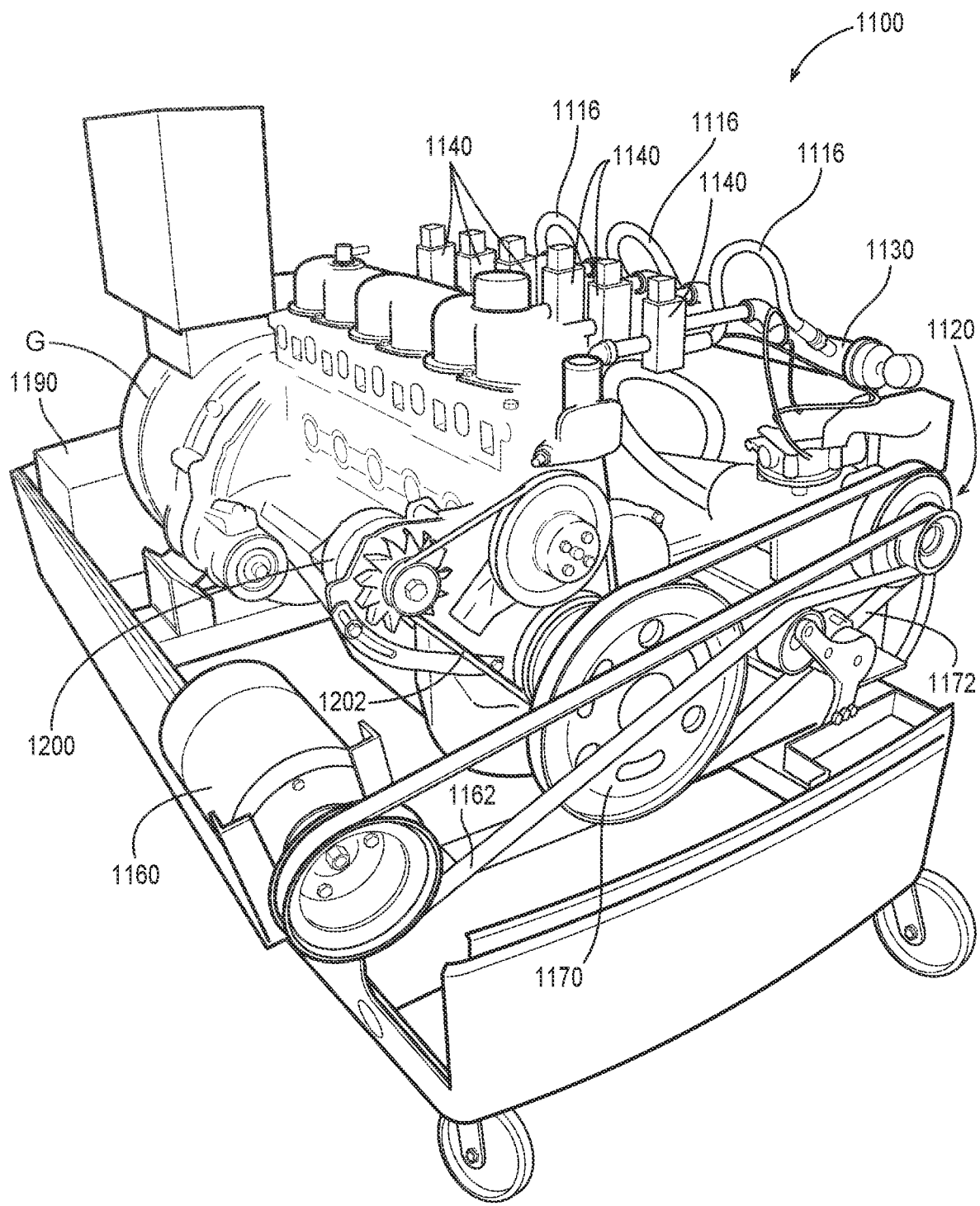

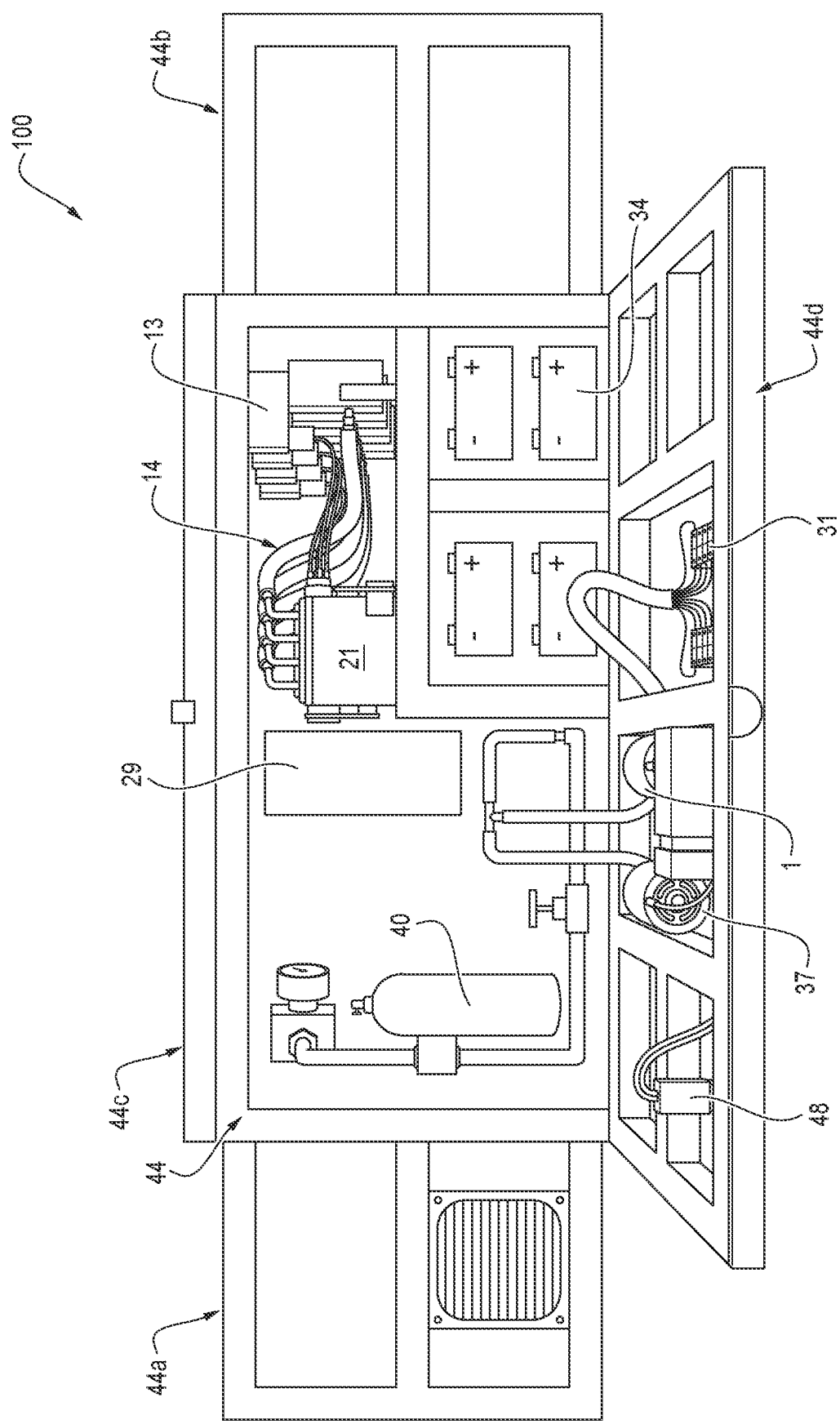

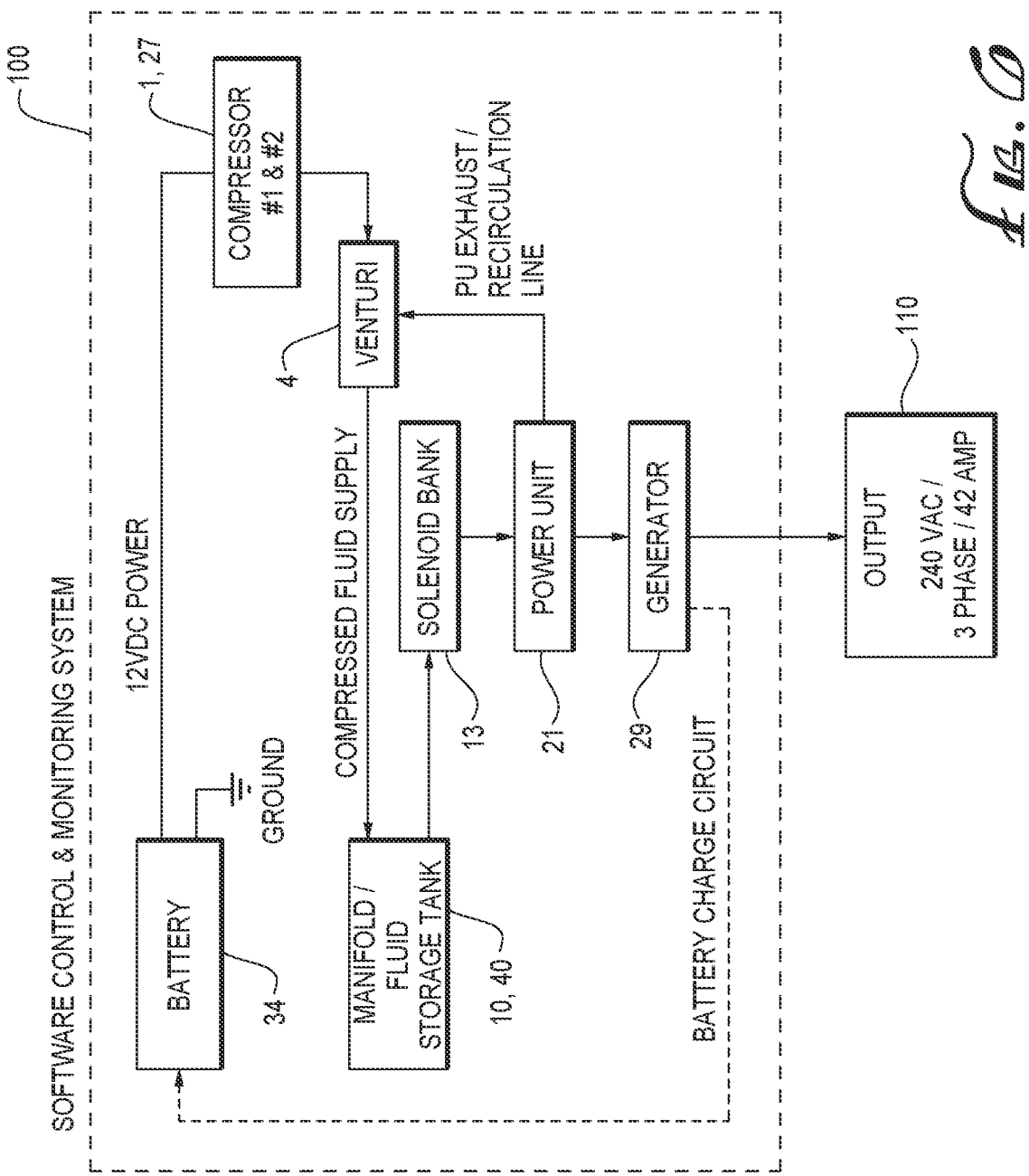

CHARGING SYSTEM LEGEND

1. Main fluid compressor
2. Compressed Fluid Supply Line
3. Proportional Control Valve
4. Exhaust injection venturi
5. Air intake solenoid valve
6. Supply line check valve
7. Flow Meter / Water Separator
8. Check Valve
9. Manifold Isolation Valve
10. System Manifold
11. Supply System Pressure Gage
12. Compressed Fluid Supply Lines
13. Supply System Solenoid Valves
14. Compressed Fluid Influent Lines (one per cylinder)
15. Power Unit Injection and Exhaust Port
16. Power Unit Exhaust Line (one per cylinder)
17. Supply System Solenoid Valve Exhaust Line
18. Main Exhaust Line
19. Main Exhaust Isolation Solenoid Valve
20. Exhaust Line Check Valve
21. Power Unit
22. Power Unit Starter Motor
23. Belt Connecting Starter Motor to Power Unit Pulley
24. Power Unit Flywheel
25. Power Unit Pulley
26. CAM Pulleys and Connecting Belt
27. Power Unit Fan
28. Power Unit Radiator
29. Shaft Mounted Generator
30. PLC System Control Module
31. 12vdc PLC Power Buss
32. PLC System Display Input Buss
33. PLC System Ground Buss
34. 12vdc Battery Bank
35. Management System, Rectifier and Inverter
36a. Male Plug Adapter to Connect Charging System to EV / HEV Onboard Electrical System
36b. Male Plug Adapter for Module to Module Connection
37. Backup and Auxiliary Charging System Compressor
38. Intake for Backup and Auxiliary Charging System Compressor
39. Charging System Check Valve
40. Auxiliary Compressed Fluid Storage Tank
41. Compressed Fluid Storage Tank Pressure Relief Valve
42. Compressed Fluid Storage Tank Isolation Solenoid Valve
43. Charging System Isolation Solenoid Valve
44. Charging System Enclosure
45. Enclosure Handles
46. System Enclosure Vents
47. Display Screen
48. Start Button
49. Stop Button
50. Open / Closed Loop System LED
51. AC Plug Outlets
53. Mode Switch (A- Open to Atmosphere, B - Closed Loop Operations)
54. Indicator LED (Mode A - Green, Mode B - Amber)
55. Fluid Recharge Solenoid Isolation Valve
56. Intake Isolation Solenoid Valve for Backup and Auxiliary Charging System Compressor System Display Inputs A. System Fluid Flow
B. System Operating Temperature
C. System Speed
D. Inlet Pressure
E. Exhaust Pressure
F. Generator Voltage and Amperage
G. Battery Voltage

FIG. 7B

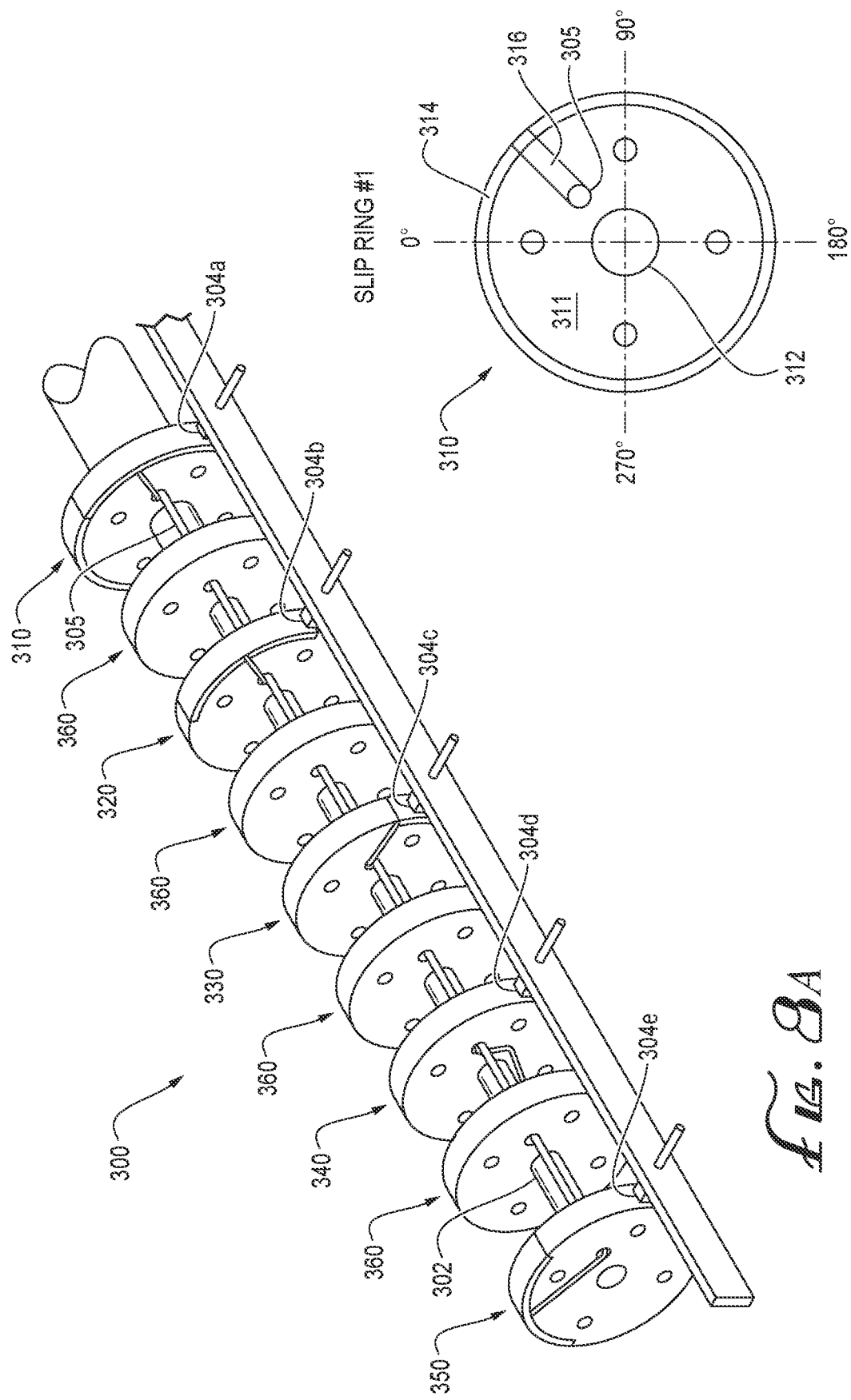

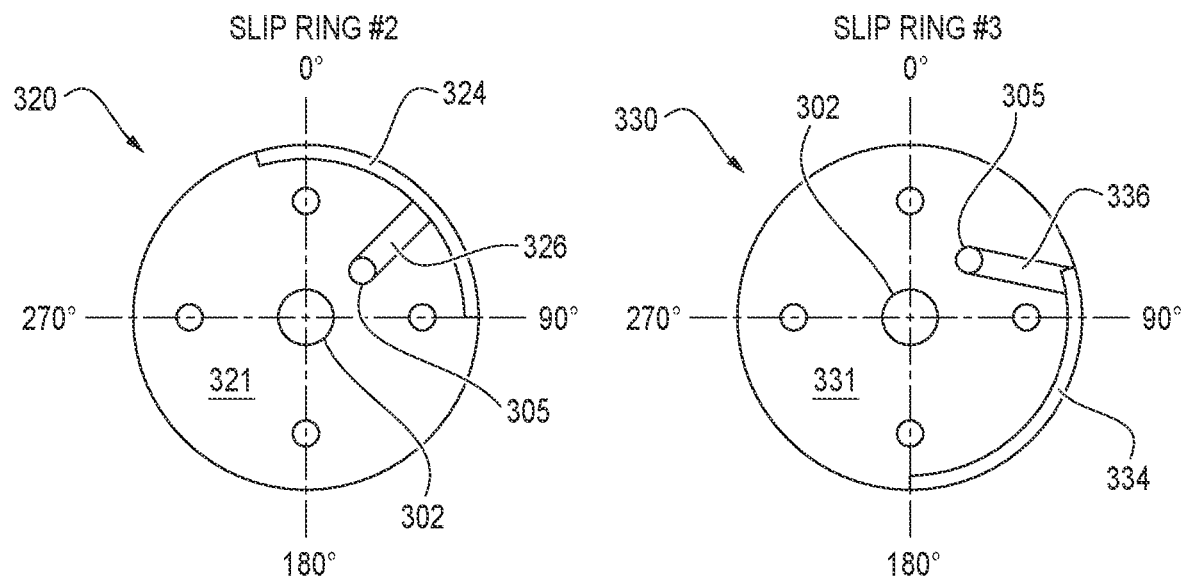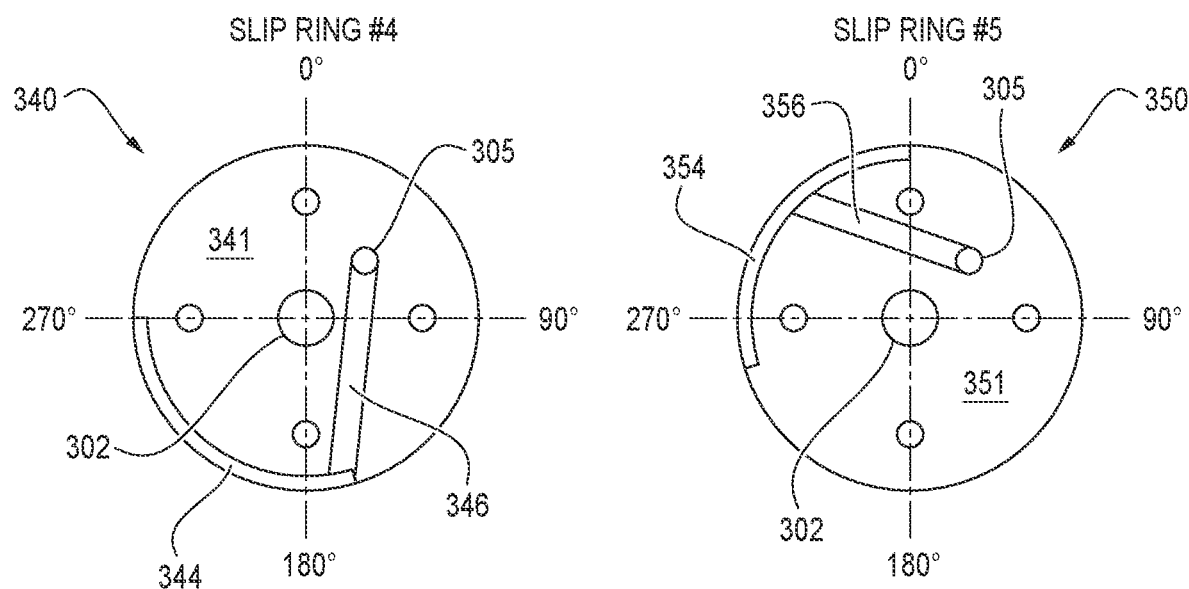
FIG. 8C

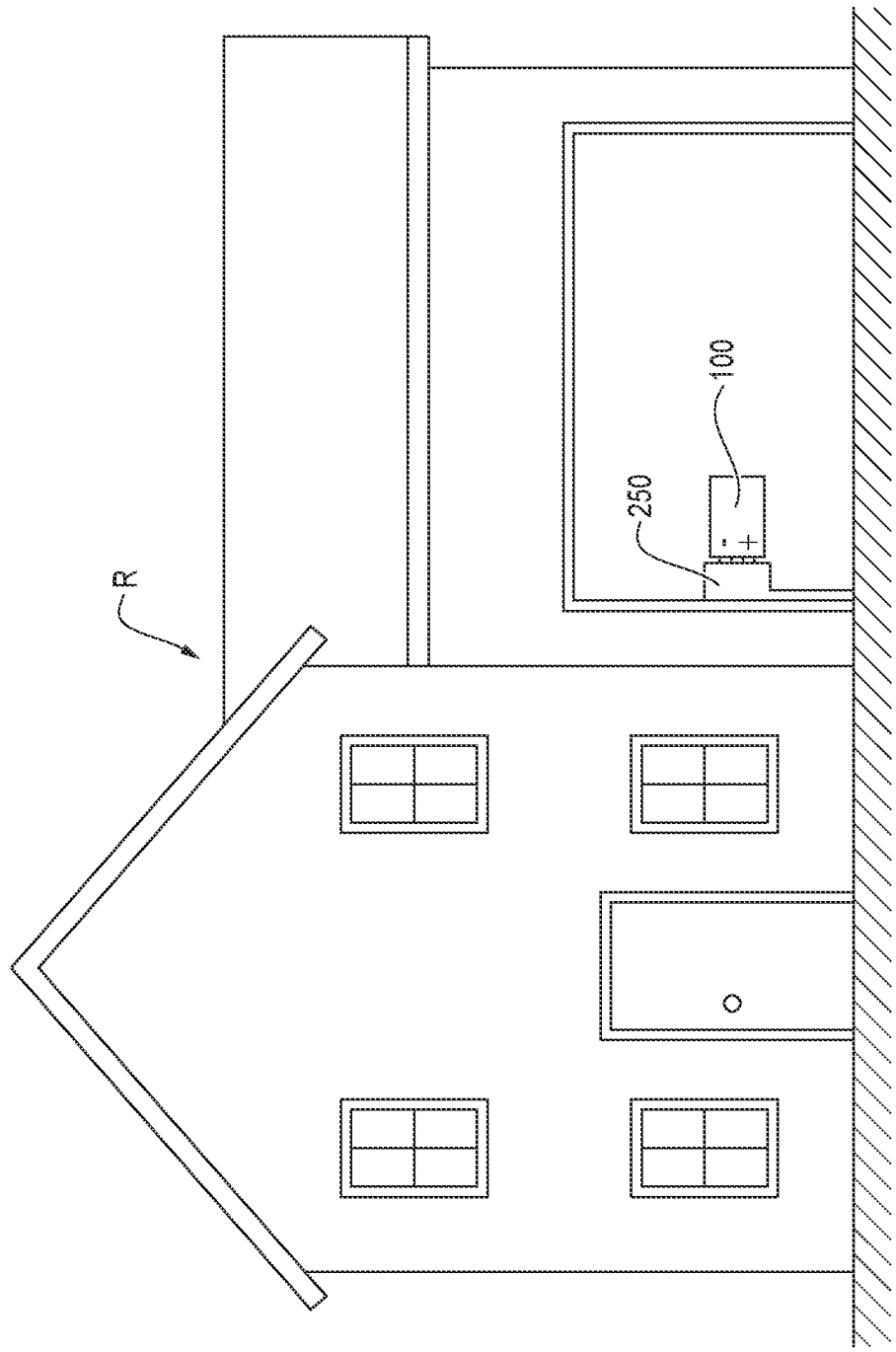

MODULAR CHARGING AND POWER SYSTEM

CROSS-REFERENCE TO RELATED APPLICATION

This application claims the benefit of U.S. Provisional Patent Application Ser. No. 63/217,942 filed Jul. 2, 2021, the entirety of which is hereby incorporated herein by reference for all purposes.

TECHNICAL FIELD

The present invention relates generally to the field of power systems, and more particularly to a modular charging and power system for providing power to electrically powered systems including, but not limited to, electric vehicles, hybrid electric vehicles, manned and unmanned remotely operated vehicles, drones, portable power units, propulsion systems, robotics, and marine and aerospace vehicles, equipment, and/or technologies.

BACKGROUND

It has been posited by both the scientific community and the federal government that pollutants generated by internal combustion engines powering industry and transportation around the world are a significant contributor to greenhouse gas and pollutant emissions into the earth's atmosphere. These pollutants include but are not limited to carbon monoxide, hydrocarbons not fully combusted, and nitrogen oxides.

In addition, it is widely known that our planet has a finite supply of oil. Oil production may have peaked worldwide, and significant new oil reserves are not easily discovered. As a result of this growing supply and demand imbalance, a spike in petroleum product pricing has drastically increased the cost of operation of internal combustion engines, which have traditionally been the primary driver of personal transportation vehicles, as well as electrical generators and other equipment.

Accordingly, it can be seen that needs exist for high efficiency power systems that reduce dependence on oil. It is to the provision of a power system meeting these and other needs that the present invention is primarily directed.

SUMMARY

The present disclosure relates generally to technologies for efficient electrical power generation, transmission, and distribution. More specifically, the present disclosure relates to highly efficient power systems and methods of use thereof. In example embodiments, the power systems according to the present disclosure are adapted or configured for charging and/or providing power to other electrically powered systems including, but not limited to, electric vehicles, hybrid electric vehicles, manned and unmanned remotely operated vehicles, drones, portable power units, propulsion systems, robotics, and marine and aerospace vehicles, equipment, and/or technologies. According to example embodiments of the present invention, the power systems, and uses/processes thereof, disclosed herein help mitigate climate change, reduce greenhouse gas emissions, and generally have a positive impact on the climate.

In example embodiments, the present invention provides a highly efficient power system and a racking system for utilizing the power system to charge and/or power other electrically powered systems.

In one aspect, the present invention relates to a modular charging and power system for delivering electrical energy to an electrically powered system, such as for example, an electric vehicle, a hybrid electric vehicle, or other manned and unmanned remotely operated vehicles. The modular charging and power system preferably includes at least one power module and a racking system. The at least one power module is configured to generate and supply electrical energy to the electrically powered system. The racking system includes at least one enclosure for receiving and releasably retaining the at least one power module. Preferably the racking system is configured to be mounted to or on the electrically powered system.

Optionally, the racking system may comprise more than one enclosure and may be configured for receiving and releasably retaining a plurality of power modules.

Optionally, the at least one enclosure of the racking system may comprise guide rails.

Optionally, the at least one enclosure of the racking system may comprise a safety stop mechanism.

Optionally, the at least one power module comprises a power unit having at least one reciprocating piston and an intake port for delivery of a pressurized working fluid to the at least one reciprocating piston. Additionally, the at least one power module may further comprise at least one fluid compressor. Additionally, the delivery of the pressurized working fluid to the at least one reciprocating piston may be controlled by a solenoid bank. Additionally, the power module may further comprise an electrical power generator connected the power unit, a high-pressure supply system manifold configured for storing the working fluid, and at least one rechargeable battery. Additionally, the source of the pressurized working fluid may comprise a pressurized storage tank.

Optionally, the modular charging and power system may further comprise a solar panel for charging the power module.

In another aspect, the invention relates to a system for charging a battery of an electrically powered system or directly powering the electrically powered system during operation thereof. The system includes a plurality of interchangeable power modules. Preferably, each power module comprises a battery and an electrical power generator connected to a fluid driven power unit. Preferably, the system also includes a rack configured for mounting or connecting to the electrically powered system. The rack includes a plurality of enclosures wherein each of the enclosures configured for removably receiving one of the plurality of power modules. Preferably, a first portion of electrical power generated by the electrical power generator is delivered to the battery and a second portion of the electrical power is delivered to the electrically powered system.

Optionally, each of the power modules comprises at least one compressor for compressing a working fluid, an intake manifold for receiving the compressed working fluid, and at least one solenoid valve for controlling delivery of the compressed working fluid from the intake manifold to the fluid driven power unit. Additionally, the plurality of power modules may be operable in an open-loop mode or a closed-loop mode, wherein the working fluid is atmospheric air in the open-loop mode and the working fluid is an inert, compressible fluid in the closed-loop mode.

Optionally, at least one power module may further comprise a slipring assembly for controlling timing of delivery of a pressurized working fluid to the fluid drive power unit.

Optionally, at least one of the power modules may comprise a digital display configured to display the health and operating parameters of the charging system.

Optionally, each of the power modules fit within a spatial envelope having a volume of about two cubic feet.

Optionally, the plurality of power modules may further comprise a fluid storage tank and a recirculation line may be provided between the power unit and the fluid storage tank.

In yet another aspect, the invention relates to a power module for delivery of electrical power to a powered system. The power module preferably includes an external housing and a fluid-driven motor within the housing. The fluid-driven motor comprises at least one reciprocating piston, an intake port, and an exhaust port. The power module also includes an electrical generator driven by the fluid-driven motor for delivering electrical power to the powered system. Preferably, the power module also includes an electronic control system configured to control the operation of the fluid driven motor.

Optionally, the power module also includes a pressurized fluid tank connected in fluid communication with the intake port of the fluid-driven motor.

Optionally, the power module also includes a compressor connected in fluid communication with the exhaust port of the fluid-driven motor Optionally, the power module also includes at least one battery connected in electronic communication with the generator.

Optionally, the electronic control system comprises at least one solenoid valve for controlling delivery of pressurized fluid to the motor through the intake port.

Optionally, the electronic control system comprises a timing shaft mechanically coupled with the motor, and further comprising at least one ring mounted to the shaft, the at least one ring comprising an electrically conductive timing segment along a periphery thereof.

These and other aspects, features and advantages of the invention will be understood with reference to the drawing figures and detailed description herein and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 4 is a second perspective view of the modified internal combustion engine of FIG. 3.

FIG. 5 shows a front view of the power module of FIG. 7 with its left side, right side, and front walls displaced.

FIG. 6 is a block diagram showing an overview operation of a power module according to an example form of the present invention.

FIG. 7B shows a legend for the detailed schematic diagram of FIG. 7A.

FIG. 8A is a perspective of a slipring assembly of a pneumatic engine according to an example form of the present invention.

FIG. 8B is a detailed view of slipring #1 of the slipring assembly of FIG. 8A.

FIG. 8C shows sliprings #2-5 of the slipring assembly of FIG. 8A.

FIG. 10 shows an example method of charging a power module at a residence according to an example form of the present invention.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
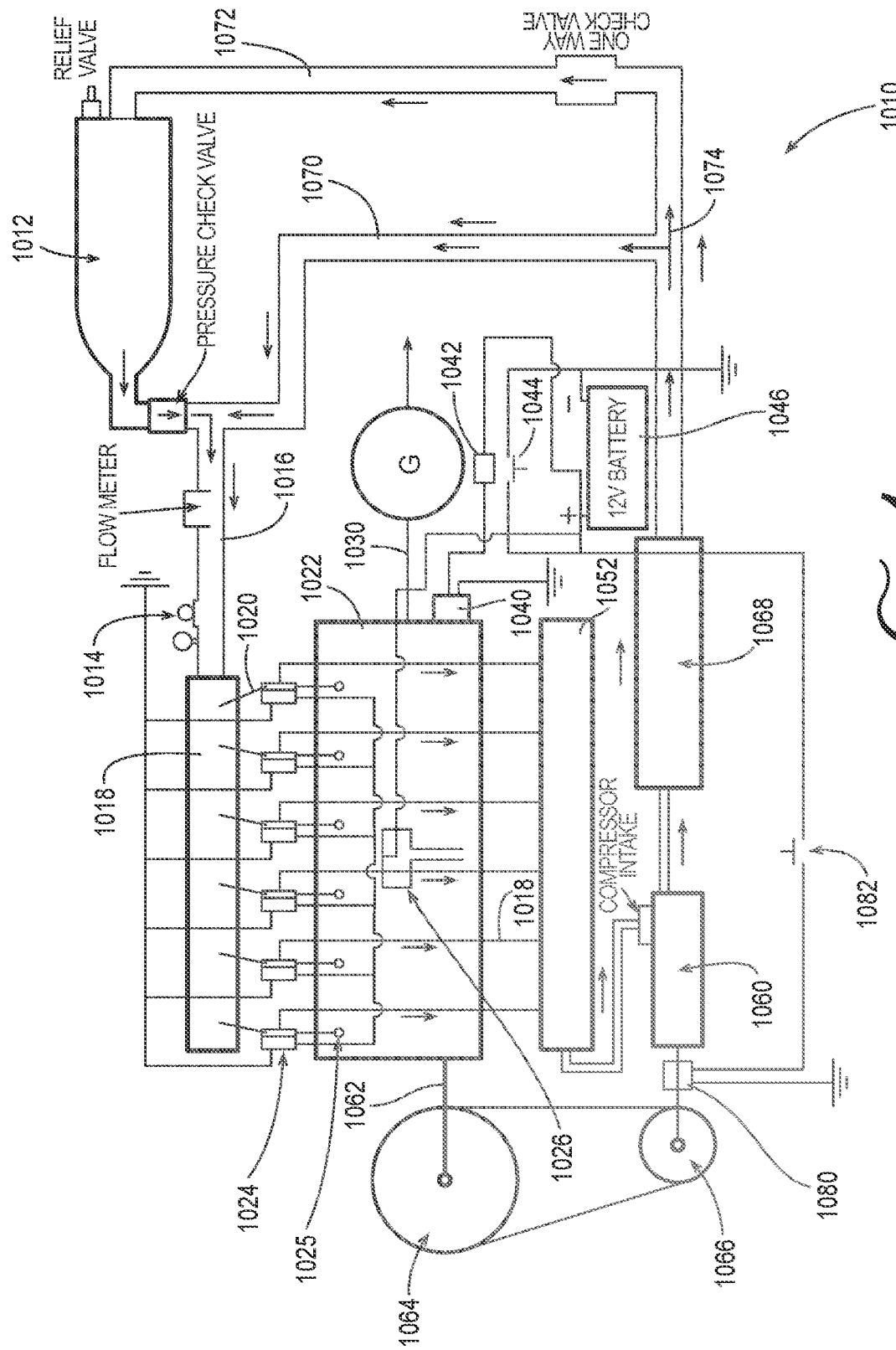
FIG. 1 is a schematic diagram showing fluid flow and drive features of a first embodiment of a pneumatic engine and drive system according to an example form of the present invention.

With reference now to the drawing figures, wherein like reference numbers represent corresponding parts throughout several views, FIGS. 1-4 show examples of power units or pneumatic drive motor systems according to example embodiments of the present invention. U.S. Published Pat. App. No. 2010/0296949 is incorporated by reference herein. FIG. 1 shows a power unit or pneumatic drive motor system 1010 according to another example form of the invention. Pressurized air or other high-pressure drive fluid is delivered from the pressure boost tank 1012, or alternatively from a compressor or other high-pressure drive fluid source, at a pressure designated the "supply" or "high" pressure. A pressure regulator 1014 in the high-pressure fluid supply line 1016 maintains the delivery pressure and flow within specified parameters. The high-pressure drive fluid is delivered to the intake or supply manifold 1018, where it is distributed to one or more supply side pressure air lines 1020. In the depicted embodiment, the pneumatic drive motor is a modified six-cylinder internal combustion engine 1022 having six pistons reciprocatingly mounted within cylinders in the engine block, and the supply manifold 1018 distributes high-pressure drive fluid to six supply side pressure air lines 1020. In alternate embodiments, single-cylinder, two-cylinder, four-cylinder, eight-cylinder, ten-cylinder, twelve-cylinder, and other arrangements are within the scope of the invention.

The supply side pressure air lines 1020 deliver high-pressure drive fluid to the cylinders of the pneumatic drive motor 1022 in a delivery sequence controlled by air solenoid injectors 1024. Optionally, an electronic timing device 1026 such as a programmed computer controls the actuation sequence of the air solenoid injectors to open and close in a specified sequence to drive the pistons and thereby turn the crankshaft of the engine according to a two-stroke or four-stroke cycle, and output rotational drive power to the engine's driveshaft 1030. A starter subassembly is optionally provided, comprising an electrical starter motor 1040, starter solenoid 1042, starter switch 1044 and battery 1046, for initiating the operation of the drive motor in similar fashion to that of starting an internal combustion engine of an automobile. The high-pressure drive fluid introduced to the cylinders of the pneumatic drive motor drives the pistons within the cylinders in similar fashion to that of the combustion gasses driving the cylinders of a standard internal combustion driven motor. The driveshaft output can be used to power an electrical generator G, to drive the drivetrain of an automobile or other vehicle, or for various other uses.

The drive fluid is discharged from the cylinders of the pneumatic drive motor 1022 via one or more exhaust or return air lines 1050 and collected in an exhaust pressure return manifold 1052. The discharged drive fluid has a reduced pressure (designated the "exhaust" or "low" pressure) relative to the higher supply pressure, due to energy extracted to drive the pistons of the drive motor. The exhausted drive fluid is delivered from the exhaust manifold 1052 to a compressor 1060. A secondary drive shaft or power take off shaft 1062 coupled to the output-power drive shaft of the motor 1022 drives the compressor 1060, optionally via a crank pulley 1064 and compressor pulley 1066 drive mechanism, with the diameter ratio of the crank and compressor pulleys selected to deliver the necessary power to the compressor necessary to raise the pressure of the air or other drive fluid from the lower exhaust pressure back to the higher supply pressure. An oil and air separator 1068 optionally is provided to remove any oil suspended in the pressurized drive fluid delivered from the compressor. The pressurized drive fluid is then recirculated back to the supply side of the motor system and into the supply manifold 18 via a primary circulation line 1070, or alternatively is directed back to the pressure boost tank 1012 via a secondary or bypass circulation line 1072. Optionally, a three-way valve 1074 is provided to control the circulation of the pressurized drive fluid to the primary circulation line 1070 or the bypass circulation line 1072.

A clutch 1080 is optionally controlled by the controller 1026 via a switch 1082 to operate the compressor on demand, as needed to pressurize the drive fluid. Optionally, a secondary drive source such as an electrical drive motor (unshown) may drive the compressor in addition to the secondary drive shaft 1062 to provide make-up pressurization, and/or allow the pressure boost tank 1012 to be switched off by closing a control valve and taken out of the fluid cycle. Electrical power to drive the electrical drive motor may be delivered from one or more batteries, the power grid, solar panels, wind turbine power generation and/or other source(s).

Because the drive fluid is recirculated through a closed loop—from the supply side, through the motor, to the exhaust side, repressurized, and returned to the supply side—rather than discharging the exhaust to the atmosphere, the system of the present invention is highly efficient, both in terms of its fuel usage and its emissions. If renewable energy sources are used to pressurize the drive fluid, the system of the present invention may be operated without the need for hydrocarbon-based fuels and have very low or even no emissions. Depending upon factors including: the efficiencies of the various components; the amount of energy drawn from the motor system to drive the generator, vehicle or other application to which the system is applied; the relative pressures of the supply and exhaust sides of the system; the capacity of the pressure boost tank; the flow rate of the drive fluid; the electrical power source, and/or the length of time the motor is to be operated, the system may be self-sustaining or require only periodic recharging.

Various components and subassemblies are suitable for use in the motor system 1010 of the present invention. In example forms, the pressurized air supply vessel 1012 is capable of containing drive fluid of up to and about 3500 psi pressurized air and is tapped with a ½" ID (inside diameter) pressure port and a ½" ID return air port, and one or more pressure relief or "pop off" valves set to release or pop off at factory settings of between 200 psi and 350 psi in example forms. The air injector solenoids 1024 are coupled to the air rail manifold 1018 and fitted in a parallel configuration to feed drive fluid through supply lines to each spark plug port 1025 of the drive motor 1022.

The solenoids 1024 are optionally 3-way solenoids that route supply fluid to the motor in a first stage, and then are switched to shut off the supply flow and allow exhaust fluid to discharge out of the same port 1025 of the drive motor to the exhaust manifold 1052 via the return air lines 1050 in a second stage. Alternatively, output or return air lines connect between separate exhaust ports of the motor cylinders to the return manifold. The pipe connections are, for example, ½" ID flexible high-pressure hose, stainless steel tubing, or other form of conduit. Air pressure regulator valves, sensors and/or gauges are optionally provided for controlling and monitoring the pressures at various stages within the system. An air dryer is optionally included to separate moisture formed by the air compression process and can for example be mounted on the return air side of the pressurized air supply vessel.

The drive motor 1022 can comprise a modified standard automotive-type engine having an engine block with cylinders, valves, pistons, a crankshaft and other components in typical fashion, for example taking the form of a six-cylinder engine. The cylinder head assembly may be substantially similar to a standard automotive cylinder head assembly with modified intake and exhaust manifolds mounted thereon. In alternate forms, the engine block, cylinder heads and pistons may be specially fabricated and formed of aluminum, polymers and/or other lightweight materials, since there is no fuel combustion that would require high-temperature resistant materials. The motor system of the present invention can operate on a modified conventional four-stroke sequence, adjusting the timing of the cam shaft, modifying the distributor rotor, and with the addition of the solenoid air switches. Alternatively, the motor system operates on a modified two-stroke sequence. In further forms of operation, the motor initially starts using a two-stroke cycle, and then switches to a four-stroke cycle. Pressurized drive fluid is delivered to each cylinder in a controlled sequence to drive the cylinder's piston down (the power stroke), thus rotating the crank shaft. In the exhaust stroke, as the subsequent cylinder upstroke begins, the air injector electric solenoid switch closes, and exhaust returns through the three-way solenoid allowing pressurized air to be exhausted from each cylinder to the exhaust manifold 1052 and returned to the intake of the air compressor 1060.

The electric timing device or controller 1026 may comprise, for example an automotive-type rotor distributor, modified with a spring mounted on its outer contact to enhance twelve-volt electrical connection with distributor cap conductors as it makes contact. The coil is optionally removed from the distributor circuit, as fuel ignition is not required in the system of the present invention. The timing device actuates the solenoids in a specified sequence to control operation of the motor. Alternatively, a programmed computer or microprocessor-based controller may be utilized. The controller supplies low voltage electric current to open and close the air injector solenoids 1024 in the proper sequence. As noted above, if an automotive distributor is used, the coil can be removed to maintain low voltage delivery to the distributor, thereby protecting the solenoids in the air injector electric switches, and the distributor's internal rotor can be modified with a metallic spring to enhance the electrical connection to each of the distributor cap's contacts. As the spring on the distributor's rotor makes contact over the distributor's conductors, electric power can be transferred through electric wires to the respective air switches 1024 for opening and closing. The timing can be changed from a four-cycle to a two-cycle operation, by way of energizing corresponding cylinder solenoids in the proper sequence on every power stroke. Timing can be accomplished by energizing solenoids 1 and 6, then 2 and 5, then 3 and 4, and so on. A voltage regulator and twelve volt (12V) automotive battery charged by a standard automotive electric alternator can complete the electrical system for the electrical system for the example embodiment. In an alternative method of timing the opening and closing of the air switches 1024, an electronic programmable semiconductor timing circuit powered by low voltage is provided.

One or more pressure relief valves within the system prevent over-pressurization, for example, fitted before and after the pressurized air supply vessel 1012, in the air pressure supply and air return lines, and/or in the high-pressure drive fluid conduits. One-way check valves are optionally provided in the air pressure lines, the air return lines, and/or in the high-pressure drive fluid conduits, to prevent pressurized air from reversing flow direction and creating back pressure and drag in the system. An air dryer is optionally included in the pneumatic system to reduce moisture produced by the compressed air. An air pressure regulator 1014 is optionally mounted on or adjacent the air rail 1018 to set and maintain optimum regulated system pressure. The compressor 1060 may, for example, take the form of an external belt-driven air compressor driven by the crankshaft of the motor to replenish sufficient air pressure to working fluid driving the motor 1022.

A variable manual pressure regulator can optionally be substituted for the pressure regulator described above. Fitted with a floor pedal, the variable manual pressure regulator can function as a "throttle" in an automotive application to increase or decrease motor revolutions by increasing or decreasing the air pressure to the cylinders. A range of automotive engines can be modified according to the present invention to achieve different power outputs including for example two (2), four (4), six (6), eight (8), ten (10) and twelve (12) cylinder engine configurations. The cylinder count and displacement can be directly proportional to power output of the pneumatic drive motor system providing a range of applications from automotive transportation to constant speed pump or electric generator drives. Diesel engines may be modified according to the invention to provide increased power output due to their larger cylinder displacement. Each manifold of the engine can be modified as described below.

Standard automotive engine components can be prepared and modified for conversion to the pneumatic drive motor by providing a retrofit kit for carrying out the modifications according to the present invention. The kit can include a distributor modified by mounting an enlarged conductive metallic spring to the rotor end to provide longer contact with conductors on distributor cap, or the components to modify an automotive distributor in like manner. The standard automotive intake and exhaust manifold can be removed and replaced with the high-pressure manifold 1018 and exhaust pressure manifold 1052, as described, which are also optionally included in the retrofit kit. The air solenoid injectors 1024 are optionally included in the kit, along with tubing and/or other conduit and connectors for piping the solenoids into communication with the respective spark plug ports of the engine block. The exhaust sides of the solenoids are connected via return pressure air lines to the exhaust pressure manifold 1052, also optionally included in the kit. A pressurized air supply vessel 1012 is optionally included, along with piping and connectors for the drive fluid circuit.

An assembly method for modifying an engine according to the present invention includes connection of the high-pressure manifold or air rail 1018 via the pressure air lines 1020 to the air injector electric solenoids 1024, and connection of the air injector solenoids to the spark plug ports of the engine block. The electrical connections from the modified distributor or controller 1026 are connected to the air solenoid injectors 1024. The crankshaft timing is set to just past "top dead center". The alternator and external belt driven air compressor 1060 are installed to engine block 1022, and the drive belts are installed and adjusted. The air pressure lines, emergency pressure valve(s), and one-way check valve(s) from the air rail manual pressure regulator are connected to the outlet/pressure side of the pressurized air supply vessel 1012. Likewise, the air return lines 1050 from the three-way solenoids 1024 are connected to the return air rail or exhaust pressure manifold 1052, and the output of the manifold is routed to the intake of the external belt driven air compressor 1060. A one-way check valve, emergency pressure relief valve(s) and an air dryer are optionally added to the return air line. The battery 1046, starter solenoid 1042, start switch 1044, and engine starter motor circuit 40 are connected.

To start the engine, the pressurized air supply vessel 1012 is charged to about 200 PSI. An external compressor can be used for this purpose. The manual pressure regulator 1014 is adjusted to about 150 PSI. The starter is engaged, the pressurized drive fluid is released from the supply tank 1012, the timing device actuates the solenoids to deliver fluid to the cylinders in the proper sequence, the pistons begin turning the motor, the compressor clutch is engaged, and the drive fluid is circulated to continue the motor's operation. Operating pressure is maintained by the compressor and/or by periodic release from the pressure tank 1012.

Figure 2:
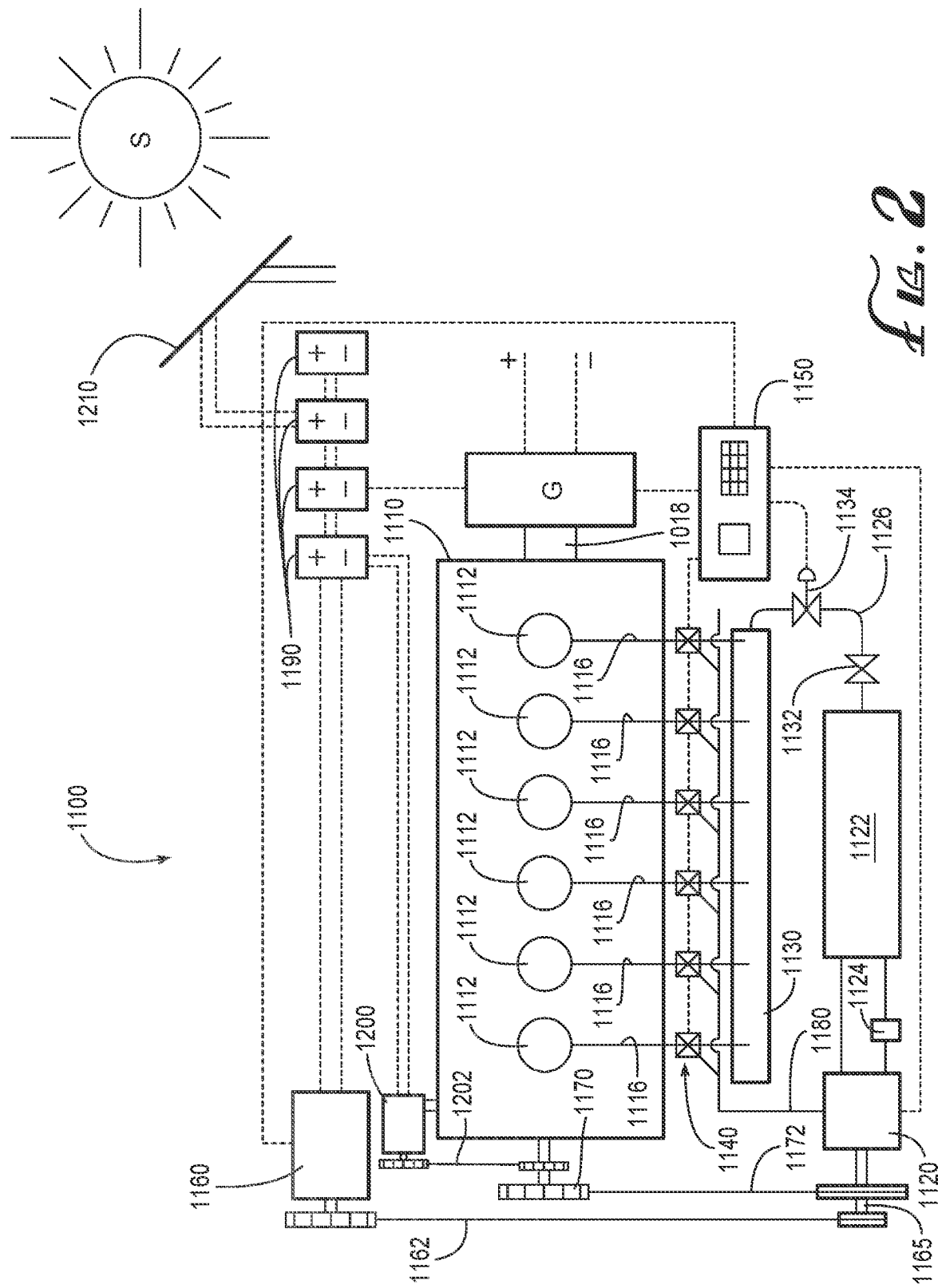
FIG. 2 is a schematic diagram showing fluid flow and drive features of a second embodiment of a pneumatic engine and drive system according to an example form of the present invention.
Figure 3:
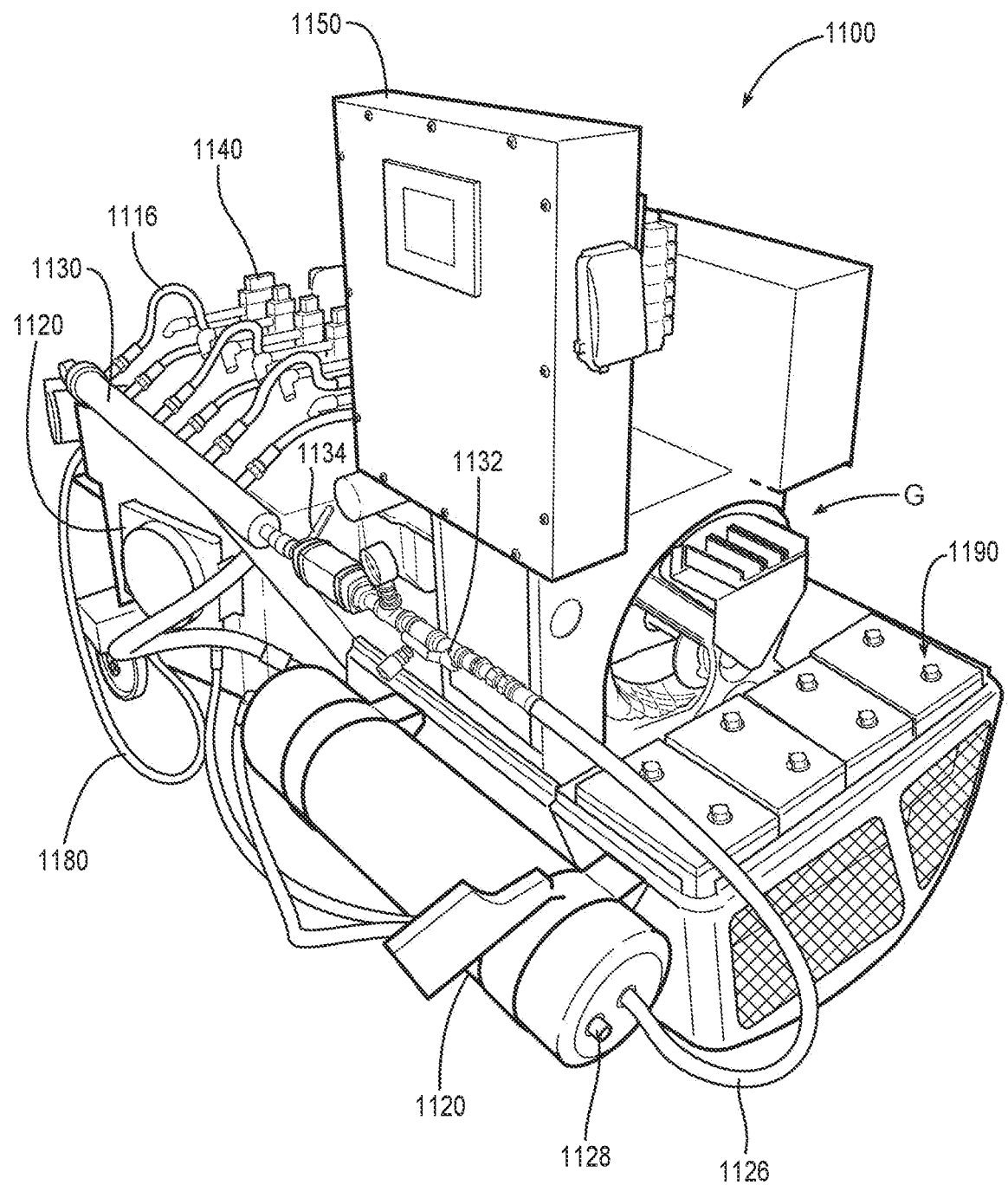
FIG. 3 is a first perspective view of a modified internal combustion engine according to an example form of the present invention.

FIGS. 2-4 show another embodiment of a power unit or pneumatic drive motor system 1100 according to another example form of the invention. An engine 1110, such as a FORD inline-6 240 CC engine, having an engine block with six pistons 1112 reciprocating in its cylinders, coupled to a crankshaft by connecting rods, drives a driveshaft 1114 to drive a power generator G or other equipment such as for example the drive train of an automobile or other vehicle, a pump, etc., in typical fashion. In example form, a 60 kW ONAN electrical generator is connected to the engine output to generate electrical power such as 110V/60 Hz A/C power. High-pressure compressed air, inert gas, water, hydraulic fluid or other liquid or gaseous drive fluid is delivered via inlet line fluid conduits 1116 to drive the pistons in a two-stroke and/or four-stroke cycle. The drive fluid is delivered to the engine cylinders through the spark plug port of each cylinder, with the intake and exhaust valves seated and disabled. In alternate forms, a customized cylinder head plate is provided, having a ported head plate with inlet ports oriented to direct the drive fluid downward onto the pistons, parallel with the axis of the cylinder and the direction of reciprocal motion of the piston. In alternate embodiments of the invention, because the high temperatures of combustion gasses are not present, the engine 1110 may include engine block, piston and/or other components comprising polyethylene or other polymeric materials, lightweight aluminum, composite or other low operating temperature materials, thereby reducing weight and manufacturing expense, as compared to iron or steel engine components.

The working fluid is pressurized by a compressor 1120, delivered to a high-pressure inlet manifold 1130, and distributed from the manifold to the engine inlets 1116 under the control of electronically switched solenoid valves 1140, such as for example 12V plunger solenoids. In example form, the compressor 1120 may comprise a 45-horsepower high-volume hydraulic rotary screw air compressor, such as a VMAC VR140 vehicle mounted air compressor. An oil/water separator and hydraulic oil reservoir 1122 and an oil cooler 1124 are optionally provided in the working fluid conduit 1126 between the discharge of the compressor and the inlet manifold 1130. The oil/water separator and hydraulic oil reservoir 1122 optionally includes a pop-off or pressure relieve valve 1128 set to release at about 200 psi. A purge valve 1132 and a control valve 1134 are optionally provided in the fluid conduit 1126 for pressurization and control of the delivery of working fluid to the inlet manifold 1130. Optionally, a pressure boost tank (unshown) may be connected to the working fluid conduit to deliver pressurized working fluid to supplement or replace the compressor as a source of high-pressure inlet working fluid.

Figure 7A:
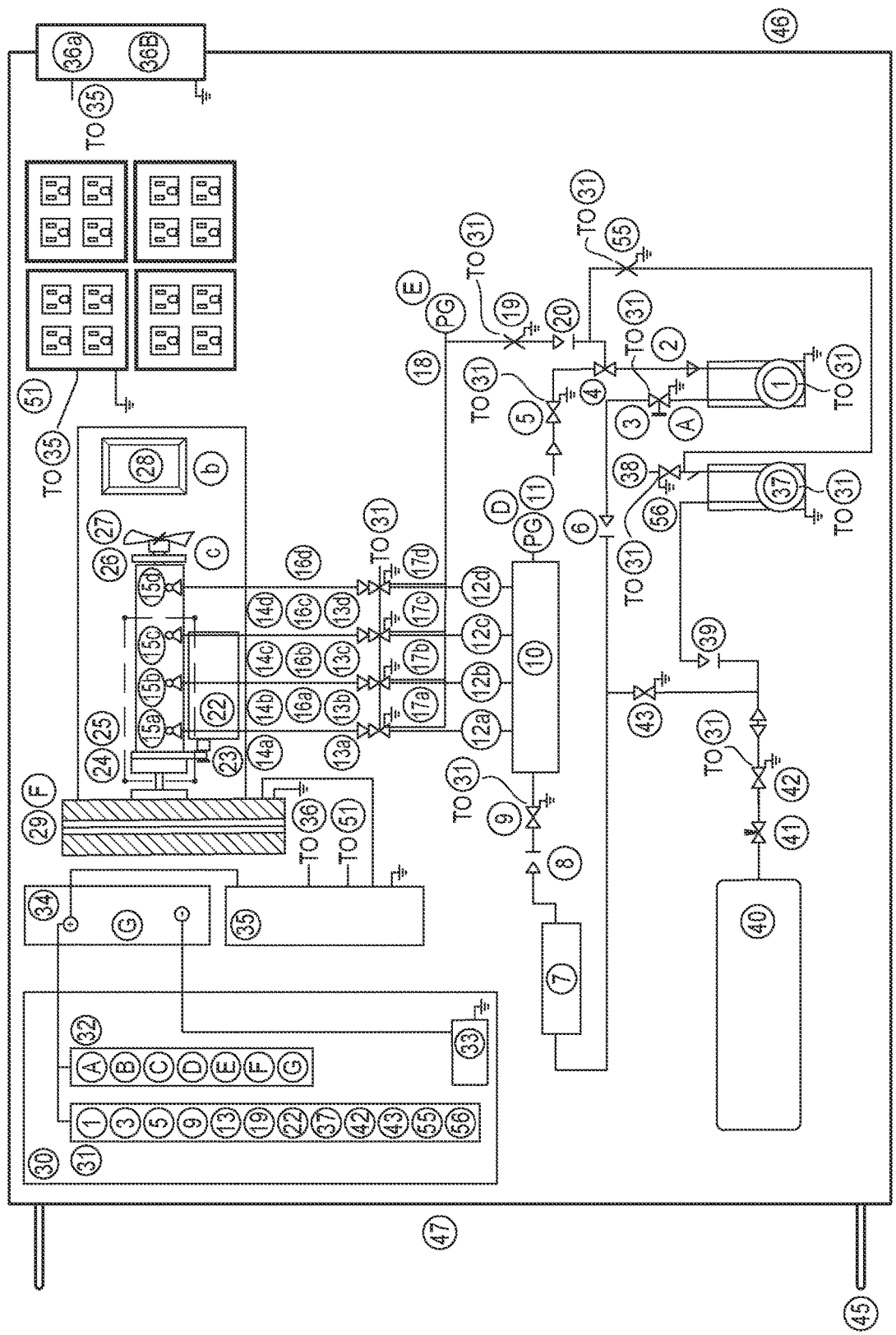
FIG. 7A is a detailed schematic diagram showing fluid flow and components of the power module of FIG. 6.

Operation of the compressor 1120, the purge valve 1132, the control valve 1134, and/or the solenoid valves 1140, as well as other components described below, can be controlled by an onboard or remote electronic control system. The control system comprises a programmed computer 1150 or microprocessor with software installed thereon, connector wiring (shown in broken lines in FIG. 7), and control sensors and actuators on the respective system components. For example, the distributor of the engine 1110 is optionally linked to the computer 1150 as a position sensor to indicate the stroke position of the pistons for timing the delivery and discharge of the working fluid. The computer 1150 preferably comprises an input device such as a keyboard or touchscreen and an output device such as a display and/or indicator lights for controlling and displaying the operating parameters of the system.

The compressor 1120 is alternatively driven by an electric drive motor 1160 and/or the crankshaft pulley 1170 of the engine 110, via first and second pulley and drive belt systems 1162, 1172, respectively. In example form, the electric drive motor 1160 comprises a 25 horsepower, 48V DC, CROWN model no. W7AA01 8.4/10.5 kW electric motor. The ratio of pulley diameters in the first and second pulley and drive belt systems 1162, 1172, are selected to deliver a specified operating power to the compressor. For example, a 2:1 ratio may be provided by a 7" pulley on the motor 1160 coupled by belt to a 3½" pulley on the driveshaft of the compressor 1120; and a 13" crankshaft pulley may be coupled by belt to a 7" pulley on the compressor shaft. An electronically switched clutch 1165 may be provided to control application of power to the driveshaft of the compressor 1120 from the motor 160 and/or the crankshaft pulley 1170.

Reduced-pressure working fluid exhausted from the engine cylinders on the upstroke or return stroke of the pistons is ported via the solenoid valves 1140 to a return conduit 1180 and delivered back to the inlet of the compressor 1120 as a ram-air intake delivery. Because the exhaust fluid is typically at a higher pressure than the atmosphere, less power is required from the compressor to bring the working fluid back up to the working inlet pressure than ambient intake air, and the suction of the compressor inlet may assist in pulling the exhaust fluid from the return conduit and cylinders to provide improved efficiency. In alternate forms, the exhaust fluid is discharged to the atmosphere, and the compressor inlet draws in entirely fresh filtered intake air from the ambient surroundings.

The electric drive motor 1160 is powered by one or more batteries 1190, and/or other power source(s). In the depicted embodiment, four 12V deep-cycle marine type batteries are connected in parallel to provide a 48V output to drive the motor 160. An alternator or generator 1200 is optionally coupled by a belt and pulley drive 1202 to a crankshaft pulley of the engine, and electrically connected to charge the batteries 1190. Alternatively, or additionally, a solar panel 1210 is provided to collect solar energy from the sun S or other light source and convert it to electrical power to charge the batteries 1190. In alternate embodiments, a wind-power turbine or other renewable, natural and/or free energy source(s) is/are utilized in place of or in addition to the solar panel to charge the batteries 1190.

In operation, the compressor 1120 is initially started under power of the electric drive motor 1160, which is in turn powered by the batteries 1190 and/or the solar panel 1210. In example forms of operation, the compressor is purged at about 2200 revolutions per minute (rpm) for about 15 seconds to develop a working pressure of about 180-200 pounds per square inch (psi) in the air or other working fluid, and then reduced to about 800-1100 rpm to maintain a working delivery pressure of about 180-200 psi at a delivery rate of about 150-250 cubic feet per minute (cfm). The computer 1150 controls actuation of the purge valve 1132 and the control valve 1134 based on pressure sensed in the working fluid conduit 1126 as the compressor is purged and transitioned to normal operating speed. An electric starter motor starts the engine 1110 turning.

Once working pressure has been reached, the computer 1150 controls operation of the solenoid valves to deliver pressurized working fluid to and from the inlet ports of the cylinders of engine 1110 to drive the engine's pistons in a predetermined two-stroke or four-stroke sequence, and optionally switches the operating cycle between two-stroke and four-stroke operation depending on the desired operating rpm speed and/or power output. The sequence of actuation and timing of pistons 1 through 6 in two-stroke operation is: cylinders 1 and 6 at 0° past top-dead-center, cylinders 2 and 5 at 60° past top-dead-center, cylinders 3 and 4 at 120° past top-dead-center, cylinders 1 and 6 at 180° past top-dead-center, cylinders 2 and 5 at 240° past top-dead-center, and cylinders 3 and 4 at 300° past top-dead-center, two cylinders firing at a time. The sequence of actuation and timing of pistons 1 through 6 in four-stroke operation is:

cylinder 1 at 5° past top-dead-center, cylinder 5 at 60° past top-dead-center, cylinder 3 at 120° past top-dead-center, cylinder 6 at 180° past top-dead-center, cylinder 2 at 240° past top-dead-center, and cylinder 4 at 300° past top-dead-center, one cylinder firing at a time. A sensor head is connected to the rotor rod of the engine's distributor (which turns with the camshaft of the engine). A positional sensor in the sensor head sends a signal to the computer controller 1150 indicating the timing position (corresponding to the degrees of rotation past top-dead-center), allowing the computer to control opening and closing of the solenoid valves 1140 in the desired sequence and timing. The timing is optionally initiated slightly past top-dead-center so that the cylinders are pressurized just after the piston starts its downstroke, to avoid generating backpressure at the end of the piston's upstroke. The solenoid valves are opened to allow free exhaust of the driving fluid on the piston upstroke, also to avoid developing back-pressure in the cylinders.

The pistons turn the engine to drive the crankshaft and in turn the driveshaft output of the engine to drive the generator, drive train or other powered equipment. In example forms of operation, the engine turns at between about 900-2200 rpm, with the speed being controlled by the computer 1150 based on user input, via operation of the control valve 1134 and control of the solenoids 1140. The speed of the engine (rpm) can be varied by operation of the control valve 1134 to adjust the airflow (cfm) to the supply rail 1130. The horsepower or torque delivered by the engine can be varied by control of the duration of time during which the solenoid valves 1140 are opened to pressurize the cylinders from the supply rail, which adjusts the pressure applied to the pistons.

Upon reaching a predefined operating speed, the clutch 1165 is operated under control of the computer 1150 to engage the compressor drive from the crankshaft pulley 1170, which in turn is driven by the engine 1110, and to disengage the compressor drive from the electric drive motor 1160. The electric drive motor 160 is then de-energized so as not to draw power from the batteries. Optionally, the electric drive motor may continue to be driven by the crankshaft pulley 1170 through the clutch, and act as a reverse-motor generator to recharge the batteries 1190. Additionally, or alternatively, the alternator 1200, the generator G, and/or the solar panel operate to recharge the batteries 1190 under the control of computer 1150.

When the pressure of the working fluid delivered by the compressor drops below a predefined threshold minimum working pressure, the computer 1150 re-engages the electric drive motor 1160 and switches the clutch 1165 to drive the compressor from the electric drive motor in order to bring the working pressure back up. Upon reaching a predefined maximum working pressure, the clutch disengages the electric drive motor 160, and the electric drive motor is deactivated. The engine continues to operate in this manner, with the compressor 1120 driven by the engine 1110 and periodically supplemented as needed by the electric drive motor 1160 to maintain desired operation. Because the electric drive motor 1160 only draws power from the batteries 1190 periodically, the battery charge may be very long lasting. Recharging of the batteries as described, optionally supplemented by solar or other renewable energy, results in a highly efficient, low emission, and long-lasting source of power.

FIGS. 5-8 show an example embodiment of a power module 100 according to an example form of the present invention. The power module 100 is a portable, self-contained charging and power system capable of generating and supplying clean electrical energy to other electrically powered systems including, but not limited to, electric vehicles, hybrid electric vehicles, electrical systems for buildings and structures, manned and unmanned remotely operated vehicles, drones, portable power units, propulsion systems, robotics, and marine and aerospace vehicles, equipment, and/or technologies. Optionally, the power module 100 is configured for universal fit and connection with multiple different powered devices.

In example embodiments, the power module 100 generally comprises a primary compressor 1, a system manifold 10, a battery bank 34, a power unit 21, a generator 29, and a pressurized fluid storage tank 40. The power module 100 further comprises a housing or enclosure having one or more hingedly connected panels and configured to contain some or all of the module's system components. In the depicted embodiment, the housing includes a left-side panel 44a, a right-side panel 44b, a top panel 44c, and a front panel 44d hingedly secured to a frame 44. In some example embodiments, the power module 100 is small enough to be portable and easily manageable for a single person to handle and exchange to and from a vehicle or other powered device or system. For example, in example embodiments, the power module 100 is configured to fit within an external housing defining a spatial envelope having a volume of no more than about two cubic feet in total volume (for example, 2' long×1' high×1' deep), or in other example embodiments, a volume of no more than about one cubic foot. In example embodiments, the power module weighs no more than 60 lbs., and preferably less than 20 lbs.

In the depicted embodiment, the power unit or pneumatic motor 21 is a modified four-cylinder internal combustion engine having four pistons reciprocatingly mounted within cylinders in the engine block. In some example embodiments, the power unit may be configured substantially as described above with reference to FIGS. 1-4. In example embodiments, the power unit comprises a modified cylinder head with no valves, lifters, or separate intake and exhaust ports. Rather, each pair of intake and exhaust ports is combined into a single port located directly above and axially aligned to the center of each piston (i.e., four combined injection/exhaust ports 16 for a four-cylinder motor). The placement of the combined injection/exhaust ports in this manner increases the force applied to the pistons and the overall performance. In alternate forms, the power unit 21 does not comprise a modified head and the compressed driving fluid is injected into the power unit through the igniter or spark plug entry. Additionally, single-cylinder, two-cylinder, six-cylinder, eight-cylinder, ten-cylinder, twelve-cylinder, and other arrangements are within the scope of the present invention.

An integrated fluid storage tank 40 and/or manifold 10 built into the charging system enclosure or frame 44 of the power module 21. Under normal operation, the system manifold 10 is configured to store a volume of compressed drive fluid. In the depicted embodiment, the compressed drive fluid is delivered from the high-pressure system manifold 10 to the power unit 21 via compressed fluid supply lines 12a-d in a delivery sequence controlled by four independent solenoids (i.e., supply system solenoid valves 13a-d)—one solenoid per cylinder. A water separator configured to remove water or moisture from the compressed fluid is optionally provided along or adjacent the manifold or between the compressors 1 and 37 and manifold 10. The water separator optionally includes a pop-off or pressure relieve valve to relieve pressure in the manifold as needed or desired. Additionally, a pressure regulator, a flow meter, and/or a supply system pressure gauge is optionally provided on the high-pressure fluid supply line and maintains the delivery pressure and flow within specified parameters. In example embodiments and modes of operation, compressed air or other inert gas drive fluid from the tank 10 may be used for system startup upon initial activation and/or pressure addition to make up for pressure loss during operation, while the system's compressor provides most of the pressurized drive fluid during normal operation after the initial start-up The firing (i.e., piston reciprocation) sequence and timing of the supply system solenoid valves 13a-d may be driven by a slipring timing shaft assembly 300. For the purposes of the present disclosure, the term "firing" refers generally to the act of activation or actuation, for example by time actuation of one or more solenoid valves to deliver pressurized air or other inert fluid to a cylinder of the modified engine to drive the piston, rather than to the combustion of fuel. As shown in FIGS. 8A-C, the slipring assembly comprises a plurality of sliprings—including one positive-lead slipring 310 (slipring #1) and four negative-lead sliprings 320, 330, 340 and 350 (slipring #2, slipring #3, slipring #4, and slipring #5, respectively)—and a plurality of slipring spacers 360 connected to a central timing shaft 302. In the depicted embodiment, a slipring spacer 360 is positioned between each slipring. The central shaft 302 is mounted to a slipring assembly housing or enclosure via bearings provided at each end of the central shaft. The central shaft is further connected to a crank shaft of the power unit 21 (i.e., by two matching, or similarly sized, timing geared pulleys—one on the crankshaft and one on the slipring assembly shaft 302—via a common toothed belt matching the teeth on the geared pulleys) such that the rotation of the slipring assembly matches the rotation of the power unit 21. The sliprings are also connected via a central electrically conductive wire 305 extending through each of the sliprings to provide 12 VDC connectivity from slipring 304a to sliprings 304b-e.

In example embodiments, each slipring comprises an arcuate electrically conductive or contact strip (preferably, of copper or other conductive material) provided along at least a portion of its body periphery. As shown in FIG. 8B, the positive lead slipring 310 comprises a contact strip 314 which extends entirely around the periphery of its slipring body 311. On the other hand, negative lead sliprings 320, 330, 340, and 350 comprise contact strips 324, 334, 344, and 354 (respectively) which extend along a portion of the periphery of the slipring bodies 321, 331, 341, and 351 (respectively). Each of the contact strips are further connected in electrically conductive contact to the central carrier wire by flat wires or conductive paths 316, 326, 336, 346, and 356.

As noted above, firing of the supply system solenoid valves 13a-d is directly correlated to the configuration of the slipring assembly 300. Specifically, the position and configuration of contact strip of each negative lead slipring dictates the firing sequence and timing of the supply system solenoid valves. In the depicted embodiment, the position of the contact strip on each subsequent negative lead slipring is phased 90 degrees, as shown in FIG. 8C (FIG. 8C shows the positions of the contact strips on the sliprings relative to one another). In the depicted embodiment, the firing order of the cylinders in the power unit 21 is "cylinders #1-3-4-2." Accordingly, cylinders #1, 3, 4, and 2 in the power unit 21 are paired to sliprings #2, 3, 4, 5, respectively.

Additionally, the stroke of each piston in the power unit is determined by the length of the contact strips. In example embodiments, the length of the contact strip is established to match the stroke of the power unit plus an advance connection to provide compressed drive fluid slightly after the cylinder reaches the top dead center firing position. In the depicted embodiment, for example, the contact strips 324, 334, 344, and 354 are approximately 18-22 mm in length including a 7 mm advancement; however, the length of the contact strip may vary depending on each power unit's cylinder stroke.

As shown in FIG. 8A, each slipring (310, 320, 330, 340, and 350) is paired to a spring-loaded brush assembly (304a, 304b, 304c, 304d, 304e, respectively) configured to make contact with the contact strips 314, 324, 334, 344, and 354, respectively. In example embodiments, the brush assemblies are mounted to a wall of the slipring assembly housing (not shown) with brush assemblies 304b, 304c, 304d, and 304e wired to four supply system solenoid valves 13a-d. In operation, as the crank shaft drives and turns the slipring assembly 300, the contact strip of each negative lead slipring makes intermittent contact with its respective brush assembly at different times (determined by the distribution of the contact strips). Each time a brush assembly makes contact with a corresponding contact strip, the contacted contact strip carries a 12 vdc or other signal voltage back through the associated brush assembly to complete the circuit which in turn fires (i.e., opens) the appropriate solenoid valve, and after the contact strip moves out of contact with the brush assembly, the signal voltage stops and the solenoid closes. Alternatively, the power unit solenoids may be controlled and managed digitally using a crank sensor coupled to the PLC module.

In example embodiments, a computer control system or programmable logic controller (PLC) 30 controls the operation of the power unit 21 by controlling the percentage or degree the proportional control valve 3 is opened or closed. The PLC has an internal clock that runs continuously and measures the total run time and intermittent system run time. Under normal operations, the power unit 21 starts in a two-stroke mode. In the two-stroke mode, the compressed drive fluid is supplied to one cylinder per one rotation of the crankshaft. If the power unit 21 falls below 1800 rpm (revolutions per minute), the PLC automatically shifts the system to the modified two-stroke mode wherein the compressed drive fluid is supplied to two cylinders simultaneously in one rotation of the crankshaft. On the other hand, if the power unit runs above 1,800 rpm, the PLC shifts the system to the four-stroke mode wherein the compressed fluid is supplied to one cylinder per two rotations of the crankshaft. If the system is pressurized beyond a set point or parameter, pressure is automatically released via pressure relief valve 41.

In example embodiments, the power unit or engine 21 operates with a four-stroke sequence or cycle completing one power cycle per two rotations of the crankshaft and four strokes of the piston, the four-stroke cycle comprising four stages including intake, compression, power, and exhaust. In other example embodiments, the power unit 21 comprises a two-stroke cycle completing one power cycle per rotation of the crankshaft.

In some example embodiments, the power unit 21 may also operate with a two-stroke or modified two-stroke cycle completing one power per rotation of the crankshaft but firing on two cylinders simultaneously. For example, in the two-stroke mode, the compressed fluid is delivered or injected per the firing sequence of the power unit (i.e., cylinder #1, cylinder #3, cylinder #4, and cylinder #2) with the injection occurring at approximately two degrees after 0 degrees equating to a cylinder firing one time per rotation of the crank. Therefore, in a four-cylinder engine, the firing sequence is cylinder #1, cylinder #3, cylinder #4, and cylinder #2. In other words, for two stroke mode, each cylinder will fire once per rotation; however, while in two-stroke modified mode, cylinders #1 and cylinder #4 fire together and cylinders #3 and cylinder #2 fire together. Accordingly, the modified two-stroke cycle can approximately double the torque of the power unit 21 compared to a non-modified two-stroke cycle.

In still other example embodiments, the power unit 21 may operate with a double modified two-stroke cycle completing two power cycles per rotation of the crankshaft. In a double modified two-stroke power unit or engine 21, two cylinders are fired at the same time at approximately 2° (degrees) past the top dead center and approximately 2° (degrees) past the bottom dead center. In the double modified two-stroke mode, the compressed fluid is injected twice per rotation (i.e., cylinders #1 and #4, cylinders #3 and #2, cylinders #4 and #1, and cylinders #2 and #3) with the injection occurring at approximately two degrees after 0 and 180 degrees equating to completion of two power cycles per rotation of the crank. Similar to the modified two-stroke cycle, the firing sequence in the double modified two-stroke cycle is also cylinder #1, cylinder #4, cylinder #3, and cylinder #2, meaning cylinder #1 and cylinder #4 fire together and cylinder #2 and cylinder #3 fire together. However, with the double modified two-stroke cycle, the torque is more than four-times the torque produced by the normal four stroke cycle. As noted above, the modified two-stroke cycle or mode about doubles the torque of the power unit and the double modified two-stroke cycle about quadruples the torque of the power unit when compared to a normal four-stroke cycle Compression of the operating or drive fluid is provided or accomplished with one or more compressors. In the depicted example embodiment, independent 12 VDC compressors 1 and 37. In example embodiments, compressors 1 and 37 provide a minimum of 40 L/min (volumetric flow) and approximately 30 psi (pounds per square inch) in pressure to the overall power module system. In some example embodiments, at least one of the compressors 1 and 37 may be a vertical conical compressor, such as for example Vert Rotors™ Vert Conical Rotary Compressor. The compressed fluid is stored in the fluid storage tank 40 and/or manifold 10 which are built into the frame of the system and configured to store a volume of compressed fluid. In example embodiments, the primary compressor 1 is adapted to provide enough compressed fluid for normal operations. However, if additional compressed fluid is required (for example, when the power module shifts into a modified two-stroke mode), secondary compressor 37 is engaged to supplement the system with additional compressed fluid. Alternatively, additional pressured fluid may be provided from the tank 10 upon demand. Once the demand or load is reduced and the system returns to normal operation, the secondary compressor 37 disengages and the system relies on the primary compressor 1 alone once again.

As shown in FIG. 6, the power module 100 also comprises a recirculation line between the power unit 21 and the fluid storage tank 40 via a venturi 4. In example embodiments, the recirculation line directs the exhaust from the power unit 21, which can be classified as an uncompressed or lower-pressure fluid (i.e., uncompressed air or other inert fluid), to the suction side of the venturi. In example embodiments, the venturi is provided between the compressors 1 and 37 and the fluid storage tank 40. The compressed fluid creates a slight negative pressure on the recirculation line as the high-pressure fluid from the compressor(s) flows across the venturi, which in turn applies a negative pressure on the exhaust side of the power unit 21. This helps evacuate each cylinder in the power unit 21 by removing any back pressure from the system. Accordingly, the recirculation line lowers the overall friction and drag on the power module 100, which in turn corresponds to lower internal energy consumption and higher overall efficiency. While this is advantageous in both open and closed loop operations, the advantage is greater in closed-loop operations because removal of such resistance in closed loop operations helps conserve the inert fluid used in the system. In some example embodiments, lower-pressure exhaust fluid from the motor of the power unit is delivered to the compressor inlet, and operation of the compressor raises the pressure of the working fluid back up to the higher operating or fluid-drive pressure, whereupon the working fluid is then recycled back to the intake ports of the motor and/or to the fluid storage tank.

The electrical power required to run the power module 100 is stored and supplied by the generator 29 and/or the battery bank 34. In example embodiments, battery bank 34 comprises three separate batteries (i.e., battery #1, battery #2, and battery #3) working in tandem to ensure at least one battery has enough charge to power the power module. For example, when battery #1 is in use, #2 is in standby and #3 is charging; when battery #2 is in use, #3 is in standby and #1 is charging; and when battery #3 is in use, #1 is in standby and #2 is charging. As each battery reaches about 25% capacity, the battery in standby is switched into service while the battery that was charging goes into standby, and the battery coming out of service begins charging. Moreover, as shown in FIG. 6, the battery bank 34 is configured to receive a trickle charge from the generator during operation or from a solar panel connected to the system when the power module is not in use, to recharge the battery bank. If the battery bank is empty, the power module 100 may draw enough power from the powered system (e.g., the EV or HEV) to start the power module. Accordingly, battery power is always available.

In example embodiments, the battery bank is used to provide 12 vdc power to the electrical components of the power module. When the power unit is running it is attached to a generator via a drive shaft. The generator produces a power (for example, 10 kW at 7,000 rpm, 240 V, ~42 amps). A portion of this produced power is placed into a recharge circuit to charge the batteries or battery bank. The remaining power (for example, 240 V, ~32 amps) is converted to VDC and output to the powered electrically powered system (e.g., the EV or HEV), or an onboard battery management system to charge the powered system's batteries during operation or use.

In example embodiments, the power module 100 further comprises a gearing assembly, including a gear box, mounted between the power unit 21 and the generator 29. Generally, an input shaft of the gear box is attached to a flywheel of the power unit 21 and an output shaft of the gear box is attached to the rotor of the generator 29. Gearing is such that a ratio of 4 to 1 is created allowing the power unit to operate at a lower RPM (approximately 2,500-3,000 rpm) and the output shaft to the generator has a resulting rotation at about 10,000-12,000 rpm. Variable output rpm allows for an increase in output electrical capacity from the generator with no additional work from the power unit. However, the power unit would have a corresponding reduction in torque. For example, replacing a 10 kW generator with a 20 kW generator will not affect any change to the power unit or any other component. In example embodiments, lower power unit rpm corresponds to less operating wear on the power unit and a longer unit/system life. In some example embodiments, the generator is PCB (printed circuit board) stator type generator (alternative to copper winding type generators).

According to example modes of use, the power module 100 is activated with a press of a start button 48. In example embodiments, the start button 48 is provided on a display screen 47 provided for example on the top or front panel of the power module 100 for easy and convenient user access. In other example embodiments, the start button may additionally or alternatively be provided on a remote control and/or a wireless device to activate the power module remotely. In still other example embodiments, the power module 200 may be started remotely from another device via a wireless connection such as for example Bluetooth, Wi-fi, cellular, radio, or the like. For example, the power module could be started from a dedicated mobile application installed on a mobile smartphone or a dedicated remote control.

Pressing the start button 48, or otherwise activating the power module, engages the PLC which initiates a startup sequence including an initial check of the system components such as for example sensors A-G. The results of the system check are displayed on displays 47 and, if paired or connected, on other paired remote devices. If no issues or errors are identified during the initial system check, the starter motor 22 is energized allowing the power unit 21 to cycle for an initial cycle period (for example about five seconds) and lubricate all internal parts via the belt 23 connected flywheel 24. After the initial cycle period, the starter motor 22 positions the flywheel 24 so that Sensor C indicates and displays a reading indicating power unit cylinder #1 is at two degrees past top dead center. Once this indication is recognized by the PLC, energy is removed from the starter motor 22 and the main power unit cycle or operations begins.

As noted above, the power module 100 is operable in two main operating modes: a closed-loop or -system mode and an open-loop or -system mode. In the open system mode, the power module 100 compresses air from its environment to drive the power unit 21. In the closed system mode, no outside air is introduced into the system. Rather, the compressible fluid utilized to drive the power unit 21 is stored in an internal, pressurized fluid storage tank 40. Accordingly, in the closed system mode, the power module 100 is still operable in environments with low or no air (such as for example underwater and in space). The display 46 shows which operating mode is active and also provides controls to select the desired system mode.

Once the initial startup operations end and the main power unit operations begin, the PLC first checks the status of the operating mode switch or actuator 53. If the operating mode switch 53 is in the open-loop position, the PLC sets the system for atmospheric operations and one or more of the following occurs:
(1) operating mode switch displays "Open" and the operating mode LED 54 produces a first color light (for example, green);
(2) proportional control value 3, air intake solenoid valve 5, manifold isolation valve 9, and the main exhaust isolation solenoid valve 19 are opened;
(3) compressor #1 is energized; and
(4) simultaneously with the system compressor #1, the PLC begins recording certain parameters, such as for example the date, time (in military or standard format), start time, and the end time (when it occurs).

When the inlet pressure reading from sensor D reaches a prescribed minimum operation pressure, the solenoid valves 13*a-d* begin opening and closing per the timing module for the power unit 100. In the depicted embodiment, the timing module is the slipring assembly 300. In other example embodiments, the timing module may be a software-controlled PLC module using a crank position sensor that transmits the crank position back to the PLC module which then controls the firing of the supply system solenoids 13*a-d* accordingly. The compressed fluid then begins flowing from the primary compressor 1 to the manifold (not shown) where the manifold is pressurized. As solenoid valves 13*a-d* open, the compressed fluid flows through lines 12*a-d* to solenoid valves 13*a*—d, then through lines 14*a-d* and into power unit cylinders 15*a-d*, per the timing module for the power unit. The resulting pressure applied to each cylinder 15*a-d*, and the corresponding piston heads, forces the piston down creating a rotational energy turning the attached shaft mounted generator 29 and providing a prescribed output power based on the generator design specifications and the rotational speed of the crankshaft.

In example modes of use, the compressed fluid is exhausted via exhaust lines 16*a-d* through solenoid valves 13*a-d* and into supply system solenoid valve exhaust lines 17*a-d*, and finally through the main exhaust line 18. The exhausted fluid continues through the main exhaust isolation solenoid valve 19 and exhaust line check valve 20 into the exhaust injection venturi 4. As noted above, the use of the venturi creates a slight negative pressure on each cylinder exhaust acting to remove any back pressure on the system that would adversely place drag on the system and effectively increase overall system operating efficiency. Some or all of the lower-pressure exhaust fluid is returned to the compressor inlet, and the compressor repressurizes the working fluid to the higher-pressure working fluid operating pressure and discharges the working fluid to be recycled back to fluid supply line to the motor intake. The compressor 1, 37 is electrically driven by an electric motor powered by the battery bank 34 and/or the generator 29. In alternate example embodiments, the compressor(s) may be driven by mechanical linkage with the modified motor or power unit 100, for example by a belt drive as with the reference to the embodiments of FIGS. 1-4. By recycling the working fluid through the closed-loop system and onboard recharging, example embodiments of the present invention enable a self-contained and highly efficient system for electrical power generation capable of long-duration sustained power delivery.

If the PLC senses a decrease in the system speed (in revolutions per min, rpm) at sensor C below a predetermined setpoint (indicating an increased load on the generator), then the proportional control valve 3 is opened further. As a result, more compressed fluid enters the system, and the overall pressure increases in the system. In turn, more compressed fluid is injected into the power unit which raises the system speed of the power unit and more electrical energy is produced. Conversely, if the PLC senses an increase in the system speed at Sensor C (indicating a decrease in load on the generator), then steps (1)-(5) above are reversed and the opposite effect occurs.

In the open-loop mode, if the primary compressor 1 is unable to maintain the necessary fluid flow or the prescribed system pressure, charging system isolation solenoid valve 43 and intake isolation solenoid valve 56 are opened to charge second, auxiliary compressor 37, and additional compressed fluid (i.e., atmospheric air) is applied to the system to support the system operations. Once the increased system volume is no longer required, and demand has decreased, the secondary compressor 37 is de-energized and valves 43 and 56 are closed. In example embodiments, the volume requirement of the system is directly related to the power unit operation mode—i.e., a four stroke, two stroke or two stroke modified mode. In the two-stroke mode, each solenoid fires with every rotation—compared to every $2^{nd}$ rotation in a four-stroke mode—thus the volume requirement is doubled. In the two-stroke modified mode, two solenoids (two cylinders) fire with every rotation thus the volume requirement is quadrupled and equally increases the resulting torque.

On the other hand, in a closed-loop system, if the primary compressor 1 is unable to maintain the necessary fluid flow or the prescribed system pressure, charging system isolation valve 43 and fluid recharge isolation value 55 (in lieu of intake isolation valve 56) are opened to charge the second, auxiliary compressor 37, and additional compressed fluid (i.e., compressible fluid from fluid storage tank 40) is applied to the system to support system operations. When the increased volume is no longer required, and demand has decreased, the secondary compressor 37 is de-energized and fluid recharge isolation valve 55 is closed.

As described above, the user can select between open-loop operation and closed-loop operation using operational mode switch 53. However, in order to select the closed-loop mode, air intake solenoid valve 5 must first be closed. In other words, closed-loop operation cannot be engaged unless air intake valve 5 is closed. If the operation mode switch 53 is in the closed-loop mode position, the PLC will allow the closed system button to be engaged. Otherwise, the PLC displays a message informing the user to perform the following steps:

(1) Install inert fluid tank 40.
(2) Set operation mode switch 53 to closed-loop operations.
(3) Verify operation mode indicator LED indicates system is set for closed-loop operations (i.e., amber LED).

If these steps or conditions are met, the PLC allows the operation mode switch to be engaged, which causes the following:

(1) air intake valve 5 and intake isolation valve 56 are closed;
(2) proportional control valve 3, manifold isolation valve 9, main exhaust isolation valve 19, compressed fluid storage tank isolation valve 42, and charging system isolation valve 43 are opened;
(3) system charging begins from the stored energy in the compressed fluid storage tank 40;
(4) primary compressor 1 is energized; and
(5) the PLC is set to begin closed-loop operations as described above.

In example embodiments, the power module 100 operates in the open-loop mode by default and operates in the closed-loop mode only if the closed-loop operation is selected by the user as described above. In alternate embodiments, the default mode of operation is the closed-loop mode, and the user may switch to open-loop mode operation. The main operation (in either open- or closed-loop mode) will continue as normal until either (1) the power module is turned off or shut off via stop button 49; (2) the powered article's (e.g., the EV or HEV) battery bank is at 90% capacity and charging is no longer required; or (3) the power module is removed from the rack.

In example embodiments, the motor or power unit 21 is driven by air or other inert pressurized fluid as described above and drives the generator 29 to produce electrical power. The generated electrical power may be utilized to directly power for example an electric or hybrid vehicle; to charge the battery of an electric or hybrid vehicle; to power a home or commercial electric system; as a standalone generator; to power other electrically powered systems, articles, or objects; for sale to utility companies via the power grid; or for various other purposes. A portion of the electrical power generated may be also directed to recharge the batteries 34. Optionally, two or more power modules 100 may be utilized in combination with one another in applications with higher power requirements or for longer duration of extended use.

Figure 9:
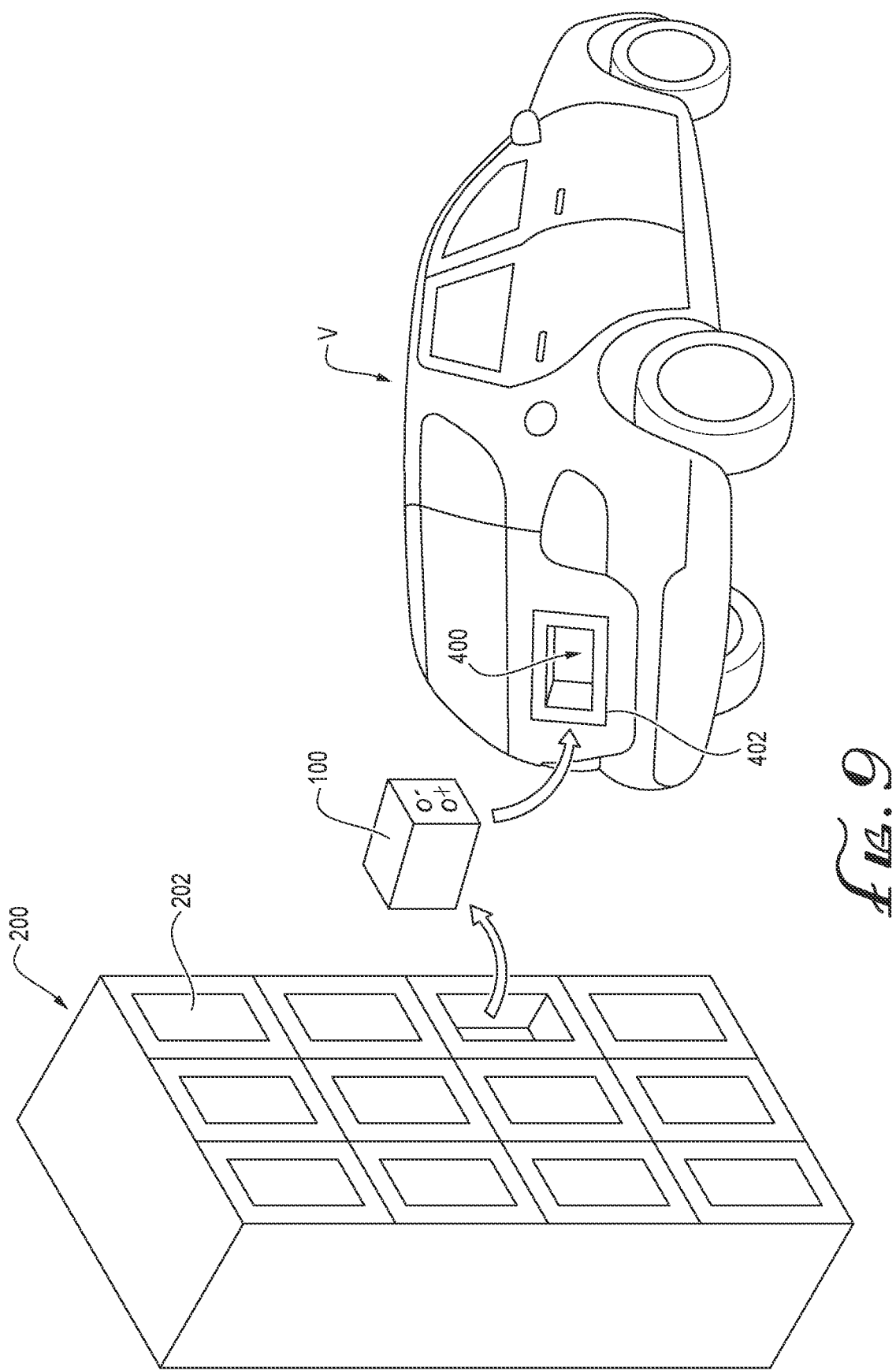
FIG. 9 shows an example method of replacing a power module from a power module charging rack to power an electric vehicle according to an example form of the present invention.

FIG. 9 shows an application of the power module 100 with electric vehicles and hybrid electric vehicles. In the depict embodiment, power module 100 is a portable, interchangeable power system for charging electric vehicles (EVs), hybrid electric vehicles (HEVs), and other manned and unmanned electric vehicles including, but not limited to, drones, remotely operated vehicles (ROVs), aircrafts, and other similar electric vehicles and/or devices. Preferably, the power module is sized to be portable and easily handled by its users. For example, in example embodiments, the power module is preferably about two cubic feet. However, the power module can be sized as needed or desired to meet the demands of each application (or, alternatively, multiple power modules can be used together to meet the demands of each application). In example embodiments, different types of vehicles (e.g., different manufacturers, different models, etc.) or other powered objects or systems may be configured with a universal receiver and power connections configured for compatibility with the power module 100, whereby the power module is configured for universal use in multiple applications.

The power module 100 optionally includes a rectifier, whereby the module is capable of operating in both direct current (DC) and alternating current (AC) modes. When paired to an EV or HEV for example, the power module can be configured to produce usable DC voltage and amperage. For example, a 240 VAC (volts of alternating current) output from the system generator may be rectified to produce for example approximately 288 to 336 VDC (volts of direct current) where it is then utilized for use in charging the EV or HEV battery bank.

Alternatively, or additionally, the power module 100 can be used as a standalone power source (i.e., in the same manner as a conventional generator or alternator) to supply power to other electronic devices and/or systems. For example, FIG. 10 shows the power module 100 secured to a receiving or docking station 250 installed in a residential structure or building R. In this form, the power module 100 is configured to supply electrical energy to power the building or a portion thereof. In such use, the 240 VAC output is rectified and inverted to produce a usable voltage. While in AC mode, software in the power module may also activate one or more AC outlets on the power module with each outlet wired through for example a minimum 20-amp breaker located and operated from the front panel. The AC outlets can be used to charge or power other electronic devices, such as for example, phones, laptops, appliances, electronic equipment, etc. In some example embodiments, using the power module 100 to provide power to for example a residential building may require connection from the power module to a transfer switch provided or installed on the building's electrical circuit.

According to example embodiments of the present invention, multiple power modules 100 may be connected or used together to increase the usable output power to meet the demand of each application as needed. Depending on the application, the power module, or set of power modules, may be configured to function as the sole, primary power system or as a back-up, secondary power system to other existing power systems.

In example embodiments, each electrically powered system or article (e.g., vehicle, device, or structure) configured for use with power modules 100 is preferably configured or fitted with a racking system or operating rack 400. The racking system 400 is preferably mounted or affixed to the powered system and comprises a housing or receptacle 402 for receiving a power module 100 therein. Preferably, the operating rack 400 is sized to accommodate the power module required or dedicated for each application. For example, the power module for a tractor trailer rig may be larger than a power module for an electric pontoon boat. Accordingly, the racking system on the tractor trailer rig will be larger than the racking system on the electric pontoon boat which requires a smaller power module. Alternatively, the racking systems may comprise more than one receptacle to accommodate multiple power modules to meet the demands of different applications. For example, the racking system mounted to a tractor trailer rig may comprise three receptacles for receiving three universally sized power modules whereas the racking system mounted to an electric pontoon boat comprises only one receptacle for one power module. Herein, modular charging and power system (MCPS) refers to a system comprising an operating rack and the respective power module(s); however, each power module can be used independently for all intents and purposes as long as a means to connect the power module to the system or device needing power is provided—for example, a power cable or other suitable electrical connectors plugged or connected to the power module's power output plug adapter 36a or 36b or outlets 51.

In example embodiments, the racking system comprises one or more receptacles configured and sized to receive therein one or more power modules. Likewise, each power module is configured to slide or otherwise fit into a corresponding receptacle utilizing guide rails attached to the receptacle, the power module, or both. The guide rails ensure that each power module that is inserted into a receptacle is properly aligned to charging ports provided in the receptacles. Installing a power module into a proper receptacle automatically connects the power module to the powered article (such as for example an EV or HEV) via a module plug provided on a rear face or side of the power module. The power modules also include one or more handles on its front face or side for handling and manipulating the power modules in and out of the rack. In example embodiments, the guiding rails comprise one or more predetermined stops affixed thereto which prevent power modules from being pulled out or falling out inadvertently from the receptacle. The guide rails comprise a release trigger or mechanism to release the power module from the guide rails for removal. According to example embodiments of the present invention, removal of any power module from the racking system does not adversely affect the operation of the powered article.

Moreover, each module comprises one or more display features on its exterior. In example embodiments, the power modules also comprise digital displays or interactive user interfaces which display the power module's and/or the MCPS's health and operating parameters. Preferably, the digital displays are provided on the front, exposed face, or surface of each power module for easy access and reading even during use. Optionally, each power module inserted in a racking system requires a multi-digit (for example, a four digit) code to begin operations. If the power module is removed and reinserted into the racking system, the multi-digit code must be reentered for the MCPS to function and operation. In some example embodiments, if more than one power module is secured to the racking system, the entire system can be controlled from one power module—preferably the power module in the first position.

In example embodiments, the power module 100 is configured to operate in either open-loop or closed-loop operational modes. In the open-loop mode, the power module compresses air drawn from its surrounding environment which is then used to drive the power unit and generator to produce electrical energy. In the closed-loop mode, the power module utilizes compressed inert fluids stored in an internal pressurized storage tank in a closed system. As such, the closed-loop mode allows use of the power module in environments and settings where there is limited or no atmospheric air, such as for example in explosive environments, underwater, and in space.

The power module 100 is also rechargeable. FIG. 9 shows a charging station 200 according to one example form of the present invention. In the depicted embodiment, the charging station 200 is configured to support and charge multiple power modules 100 simultaneously and comprises a plurality of receptacles or slots 202 for removably receiving power modules 100 therein. Each receptacle 202 comprises at least one charging outlet or port adapted for establishing an electrical and/or fluid connection with the power modules 100 to replenish or recharge the batteries and/or pressurized driving fluids. Each receptacle 202 further comprises guidance or transfer features such as for example sliding rails or channels to facilitate easy module insertion into and retrieval from the receptacle. Alternatively, the sliding rails also ensure that each power module inserted into a receptacle is properly aligned to the charging ports during installation. Installing a power module into a proper receptacle automatically connects the power module to the powered article or system (such as for example an EV or HEV) via a module plug provided on a rear face or side of the power module. In example embodiments, each receptacle also comprises certain safety features. For example, the sliding rails include safety stop mechanisms which prevent a power module from being pulled out or sliding out beyond a preset distance unless the safety stop mechanism is intentionally disengaged.

Charging stations may also comprise other forms and configurations to handle various capacities and demands. In some example embodiments, the charging station 200 may alternatively, or additionally, include one or more means, such as for example cables, tubes, lines, etc., for directly plugging into or connecting to the powered system. In other example embodiments, charging station may be configured to charge one power module at a time rather than multiple power modules simultaneously. In still other example embodiments, the station 200 may alternative, or additionally, be utilized as a vending station for power modules. For example, users may deposit dead or malfunctioning power modules into an empty receptacle 200 for example in exchange for a replenished or new power module. The station 200 conducts a system check on the deposited power module, and if the power module is dead or malfunctioning, the power module is locked to the receptacle and a service provider or supplier is alerted to retrieve and replace the dead power module from the station 200. In still other example embodiments, a docking station 250, as shown in FIG. 10, may be configured to receive a power module 100.

In some example embodiments, the docking station 250 may also include a separate charging station in addition to the docking station 250. In other example embodiments, the docking station 250 may be configured with charging capabilities for recharging spent or dead power modules in the same station.

Preferably, the charging stations 200 are located in high-traffic areas to maximize and ease use thereof. For example, charging stations 200 can be located near high-traffic intersections, commercial and business centers, parking lots/decks, etc. so that the charging stations are easily and conveniently accessible. In use, users either acquire new power modules or exchange used or spent power modules for fully charged or new ones at the charging stations. In some example embodiments, users may recharge their power module rather than exchanging theirs with another. In example embodiments, the charging stations can be set up or constructed with payment systems to facilitate the sale or rental of power modules. The charging stations may also comprise one or more displays showing the health and/or available charge of each power module docked in the charging station.

The modular charging and power system and/or the power modules can deliver a wide range of DC voltage. Accordingly, the self-charging system and its power modules can be used with lithium-ion batteries, or any other suitable type of batteries being developed now or planned for development in the future, such as for example solid state batteries, lithium silicon batteries, lithium metal batteries, lithium sulfur batteries, lithium air batteries, NanoBolt™ lithium tungsten batteries, zinc manganese oxide batteries, etc. Additionally, or alternatively, the system may be scaled up or down in size and/or capacity in order to accommodate different power demands or needs of each application.

In example embodiments, the modular charging and power system and/or the power modules can be configured for use with EVs, HEVs, fuel cell vehicles, or other types of vehicles or machines that for example use batteries to drive or power motors for propulsion, including, but not limited to, passenger cars, SUVs, vans, pickup trucks, RVs, buses, taxis, limousines, delivery trucks, garbage trucks, intermodal delivery trucks, trains, race cars, drones, electric airplanes, delivery robots, warehouse robots, boats, barges, yachts, cruise ships, freighters, etc.

In other example embodiments, the MCPS and/or the power modules can be used for example as primary or secondary (i.e., back-up) power systems for homes, farms, businesses, police, military, schools, cell towers, data centers, islands, or to charge other power systems, such as for example the Tesla Wall™, when solar or wind power is not available or as a supplemental power source working in conjunction with solar and wind power systems.

The MCPS can generate 120 v or 240 v AC, or comparable DC, through inversion and/or rectification, providing flexible alternatives depending on each power requirement. The MPCP can also be configured for use as an AC power source for all types of vehicles or conditions mentioned above, whether they are open-loop or closed-loop system, for cars, vans, pickup trucks, RV's, buses, taxis, limousines, delivery trucks, semi's, trains, boats, yachts, cruise lines, freighters, helicopters, drones, air taxi's, submarines, space stations, space vehicles, or other suitable space apparatuses, systems, vehicle, and/or objects. For example, in its closed-loop operational mode, the modular charging system can be used in space to deliver power to satellites, space stations, and/or space vehicles on the Moon, Mars, or any other moons, planets, asteroids, comets, or other extraterrestrial or planetary bodies with little or no atmosphere.

While the invention has been described with reference to example embodiments, it will be understood by those skilled in the art that a variety of modifications, additions and deletions are within the scope of the invention, as defined by the following claims.

What is claimed is:

1. A modular charging and power system for delivering electrical energy to an electrically powered system, comprising:
    at least one power module configured to generate and supply electrical energy to the electronically powered system, and
    a racking system mountable to the electrically powered system and comprising at least one enclosure for receiving and releasably retaining the at least one power module.

2. The modular charging and power system of claim 1, wherein the racking system comprises more than one enclosure and is configured for receiving and releasably retaining a plurality of power modules.

3. The modular charging and power system of claim 1, wherein the at least one power module comprises a power unit having at least one reciprocating piston and an intake port for delivery of a pressurized working fluid to the at least one reciprocating piston.

4. The modular charging and power system of claim 3, wherein the at least one power module further comprises at least one fluid compressor.

5. The modular charging and power system of claim 4, wherein the power module further comprises an electrical power generator driven by the power unit.

6. The modular charging and power system of claim 5, wherein the power module further comprises a pressurized storage tank for storing the pressurized working fluid.

7. The modular charging and power system of claim 6, wherein the power module further comprises at least one rechargeable battery.

8. The modular charging and power system of claim 5, wherein the power module further comprises a high-pressure supply system manifold configured for storing the working fluid.

9. The modular charging and power system of claim 3, wherein the delivery of the pressurized working fluid to the at least one reciprocating piston is controlled by a solenoid valve.

10. A system for charging a battery of an electrically powered system or directly powering the electrically powered system during operation thereof, the system comprising:
    a plurality of interchangeable power modules and a rack mountable to the electrically powered system and comprising one or more enclosures, each enclosure configured for removably receiving one of the plurality of power modules,
    wherein each power module comprises
        a housing,
        a fluid-driven engine having a plurality of cylinders,
        a battery bank,
        a compressor for compressing a working fluid,
        a storage tank for storing the compressed working fluid,
        a slipring assembly for controlling the firing sequence and timing of delivery of the compressed working fluid to the four cylinders of the fluid-driven engine, the slipring assembly comprising at least one positive-lead slipring and one negative-lead slipring for each cylinder, an electrical power generator driven by the fluid-driven engine, and a recirculation line directing decompressed working fluid exhausted from the fluid-driven engine to the storage tank, wherein a first portion of electrical power generated by the electrical power generator is delivered to the battery bank for charging the battery bank, and a second portion of the electrical power generated by the electrical power generator is delivered to the electrically powered system.

11. The charging system of claim 10, wherein each power module an intake manifold for receiving the compressed working fluid and at least one solenoid valve fluidly connected to each cylinder for controlling delivery of the compressed working fluid from the intake manifold to each cylinder.

12. The charging system of claim 11, wherein the power modules are operable in an open-loop mode or a closed-loop mode, wherein the working fluid is atmospheric air in the open-loop mode and the working fluid is an inert, compressible fluid in the closed-loop mode.

13. The charging system of claim 11, wherein the slipring assembly is electrically connected to the at least one solenoid valve for controlling timing of delivery of a pressurized working fluid to the cylinders.

14. The charging system of claim 10, wherein the housing comprises a volume no more than about two cubic feet.

15. A power system for delivery of electrical power to a powered system, the power system comprising:

an external housing;

a fluid-driven motor provided within the housing and comprising a plurality of cylinders, each of the cylinders comprising a combined intake and exhaust port for receiving pressurized fluid and exhausting depressurized fluid therethrough and at least one reciprocating piston movably positioned therein;

a compressor in fluid communication with the fluid-driven motor and configured to receive depressurized fluid from the fluid-driven motor;

an electrical generator driven by the fluid-driven motor, wherein the electrical generator is configured to supply electrical power to the powered system;

a plurality of batteries wherein, during operation, the batteries work in tandem with one another such that at least one battery supplies electrical power to the compressor, at least another battery receives a charge from the electrical generator, and at least yet another battery remains in stand-by; and an electronic control system configured to control the operation of the fluid driven motor.

16. The power module of claim 15, further comprising a pressurized fluid tank in fluid communication with fluid-driven motor.

17. The power module of claim 15, wherein the electronic control system comprises at least one solenoid valve for controlling delivery of pressurized fluid to the fluid-driven motor.

18. The power module of claim 17, wherein activation of the at least one solenoid valve is controlled by a slipring timing shaft assembly comprising a positive lead slipring and at least one negative lead slipring.

19. The power module of claim 18, wherein the slipring timing shaft assembly comprises a plurality of negative lead sliprings, and wherein the positive lead slipring comprises a conductive strip extending entirely around the periphery of the positive lead slipring and each of the negative lead sliprings comprises a conductive strip extending along a portion of the periphery of each negative lead slipring.

20. The power module of claim 18, wherein the slipring timing shaft assembly is configured to operate the fluid-driven motor in two-stroke, four-stroke, or modified two-stroke cycles.

* * * * *